United States Patent [19]

Takei

[11] Patent Number: 4,769,649

[45] Date of Patent: Sep. 6, 1988

[54] IMPRINTING APPARATUS

[75] Inventor: Katsumori Takei, Nagano, Japan

[73] Assignee: Seiko Epson Kabushiki Kaisha, Tokyo, Japan

[21] Appl. No.: 841,925

[22] Filed: Mar. 20, 1986

[30] Foreign Application Priority Data

Mar. 22, 1985 [JP] Japan .................................. 60-57960
Mar. 22, 1985 [JP] Japan .................................. 60-57961
Mar. 22, 1985 [JP] Japan .................................. 60-57962

[51] Int. Cl.[4] .............................................. G01D 15/00
[52] U.S. Cl. .................................... 346/74.2; 346/105
[58] Field of Search ................. 346/74.2, 105, 76 PA, 346/76 R, 74.4; 355/3 TR, 3 TE; 400/241-241.4, 120, 662, 119; 101/DIG. 5; 358/301; 219/216 PH

[56] References Cited

FOREIGN PATENT DOCUMENTS 0049280 3/1983 Japan .................................. 400/662
0101081 11/1983 Japan .................................. 400/662
0187593 9/1985 Japan .................................. 346/76 R
0226274 11/1985 Japan .................................. 355/3 TR

*Primary Examiner*—Arthur G. Evans
*Attorney, Agent, or Firm*—Blum Kaplan

[57] ABSTRACT

An imprinting apparatus having application means for applying thermal energy to a recording portion of thermoplastic magnetic ink and generation means for simultaneously generating magnetic attraction force in the ink is provided. The recording portion of the ink is transferred to a transfer medium by the magnetic attraction force while the application of thermal energy is controlled. The ink and the transfer medium do not come into contact with each other in a non-recording portion of the ink. An ink medium having a support layer and a thermoplastic magnetic ink layer for use with the imprinting apparatus of the invention is also provided.

65 Claims, 28 Drawing Sheets

FIG. 16(c)
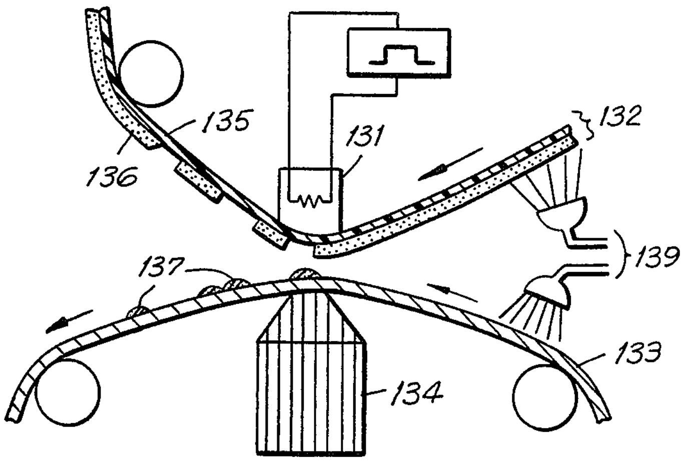
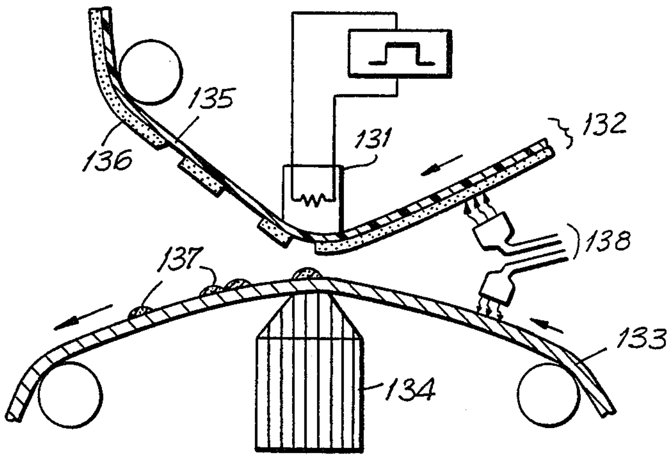
FIG. 16(d)

FIG. 16(e)
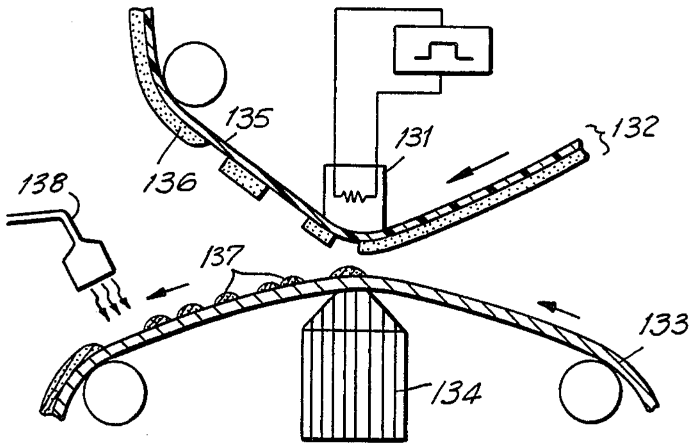
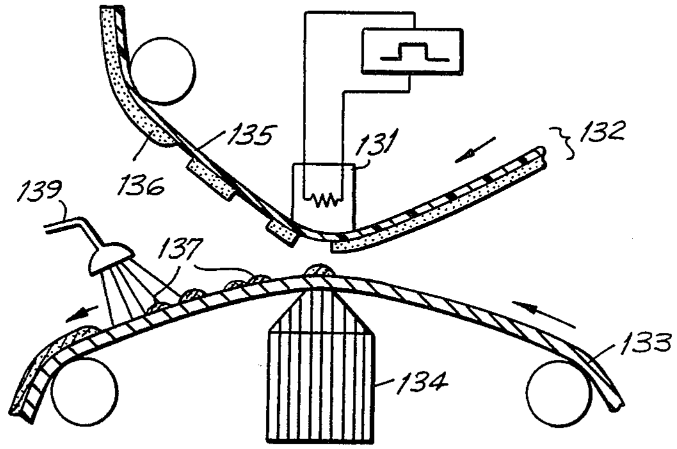
FIG. 16(f)

FIG. 19(a)
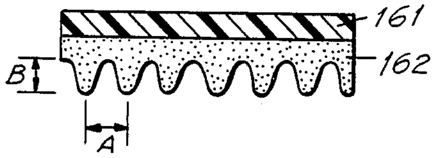
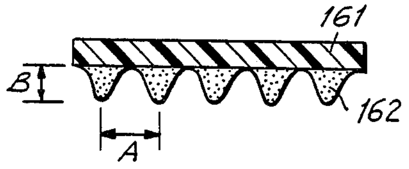
FIG. 19(b)
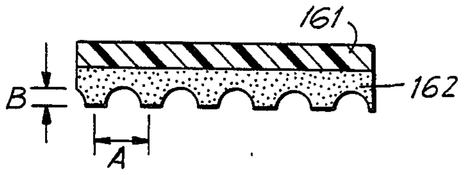
FIG. 19(c)
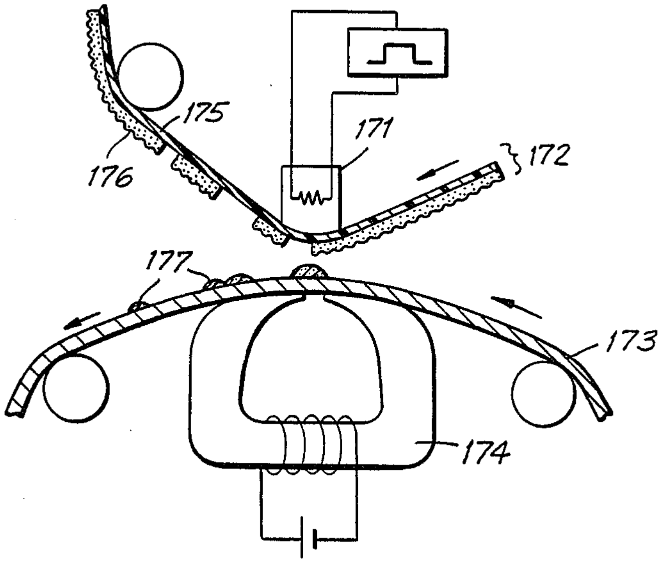
FIG. 20

FIG. 27
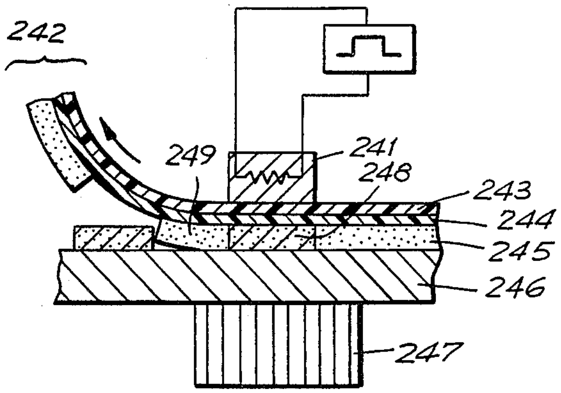
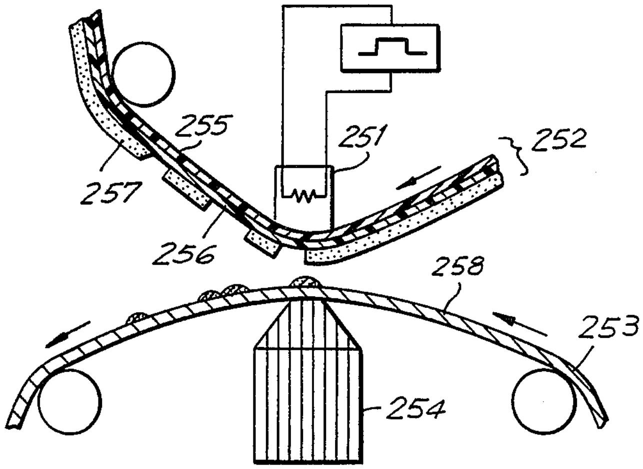
FIG. 28
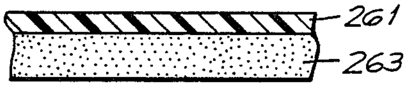
FIG. 29

IMPRINTING APPARATUS

BACKGROUND OF THE INVENTION

This invention relates to an imprinting apparatus and, in particular, to a non-impact imprinting apparatus for reproducing characters and graphic images by transferring thermoplastic magnetic ink onto a transfer medium by means of heat and magnetism.

A number of miniature and low-cost non-impact imprinting apparatuses using magnetic ink have been proposed. For example, Japanese Patent Publication No. 96541 discloses an imprinting apparatus in which magnetic ink is used as an ink material for magnetothermal transfer of the melted ink. Magnetic attraction force produced by a magnet that is separate from the heat supply acts on the ink in order to form corresponding thermal images. This type of apparatus is illustrated in FIG. 1 of the drawings in the present specification.

In the apparatus of FIG. 1, a thermal head 301 and a magnet 306 are provided. A transfer medium such as transfer paper 305 and an ink medium 302 are adapted to be drawn between thermal head 301 and magnet 306 in such a way that ink medium 302 is positioned adjacent thermal head 301 and transfer paper 305 is positioned adjacent magnet 306. Ink medium 302 consists of base film 303 on the side of thermal head 301 and thermoplastic magnetic ink 304 on the side of and in contact with transfer paper 305. Ink medium 302 and transfer paper 305 are drawn between thermal head 301 and magnet 306 and heat is applied to ink 304 through base film 303 by thermal head 301. This causes melted ink 304 to adhere to transfer paper 305.

If it is desired to permanently adhere an ink dot 307 to transfer paper 305, magnetic force is applied to ink 304 through transfer paper 305. Ink 304 is then torn off base film 303 and preferentially adheres to transfer paper 305. If no permanent adherence is desired, no magnetic force is applied and ink 304 is separated from transfer paper 305 and remains preferentially adhered to base film 303 of ink medium 302.

In this apparatus, ink 304 contacts both base film 303 and transfer medium 305. This is true independent of whether ink 304 is at a recording portion and is to be transferred or at a non-recording portion and is not to be transferred. Problems arise because once the ink at a recording portion is melted and stuck onto transfer paper 305, base film 303 can be torn off together with ink 304, resulting in defective transfer. Additionally, ink 304 can remain adhered to transfer paper 305 at a portion where ink transfer is not desired.

Referring to FIG. 2, thermal transfer recording can generally be accomplished under the condition of inequality, that is:

$$F_B, F_A << F_C, F_D$$

wherein $F_A$ and $F_B$ are forces for accelerating the transfer of recording portion ink onto transfer paper and in which $F_A$ represents the adhesive force between the ink and the transfer paper and $F_B$ represents the cohesive force within the recording portion ink; and wherein $F_C$ and $F_D$ are forces for inhibiting the transfer of the ink and in which $F_C$ represents the adhesive force between the ink and the base film and $F_D$ represents the cohesive force between recording portion ink and non-recording portion ink. As shown in FIG. 2, which includes a base film 311, a recording portion ink 312, a non-recording portion ink 313 and a transfer paper 314, $F_A$ and $F_B$ are directed downwards toward transfer paper 314 and away from base film 311 and $F_C$ and $F_D$ are directed upwards away from transfer paper 314 and towards base film 311.

The melted recording portion ink 312 is attracted toward transfer paper 314 by magnetic attraction forces $F_A$ and $F_B$ so that the probability of adherence of melted ink 312 to transfer paper 314 is increased as the magnetic attraction forces $F_A$ and $F_B$ are increased. The efficiency of transfer can be improved by increasing the force $F_A$. However, base film 311 also adheres to ink 312 at the time of adherence of ink 312 to transfer paper 314. Consequently, forces $F_C$ and $F_D$ directed toward base film 311 also exist. When transfer paper having greatly inferior surface smoothness is used, magnetic attraction force $F_A$ may become less than either of transfer inhibiting forces $F_C$ or $F_D$, thereby causing defective transfer.

As shown in FIG. 3, prior art printing methods cannot provide normally formed recording dots when transfer paper 322 has inferior surface smoothness. This is due to the existence of non-contact portions, i.e. valley portions 324, between transfer paper 322 and magnetic ink 323. Magnetic ink 323 sticks to the convex portion 325 of the fiber top of the surface of the paper and does not adhere on valley portions 324. Accordingly, non-uniform recording dots 323 are provided. In particular, normally formed recording dots cannot be obtained when rough paper having Beck's smoothness equal to 1–2 sec. is used.

A top plan view of a recorded dot 332 on rough paper is shown in FIG. 4. As shown, the magnetic ink sticks only to the convex portion 331 at the top of the fiber and not in the valley portions. Accordingly, a non-uniform recorded dot 332 is formed.

The same phenomenon occurs in the case of high resolution recording dots. In particular, normally formed recording dots cannot be obtained when recording dots having small areas are desired.

According to the conventional method described, thermoplastic magnetic ink 304 is in contact with transfer paper 35, as shown in FIG. 1. Accordingly, much of the heat produced by thermal head 301 passes through magnetic ink 304 and escapes in transfer paper 305. This creates an efficiency problem due to the fact that a large portion of the heat is not used to melt the thermoplastic magnetic ink and is lost as heat at the time of transfer.

Additionally, friction, heat conduction and the like arise between thermoplastic magnetic ink 304 and transfer paper 305. This creates problems because the thermoplastic magnetic ink can adhere to a non-recording portion of the transfer paper by means other than normal magnetic recording means. This phenomenon is known as "print stain".

Accordingly, it is desirable to provide an imprinting apparatus for reproducing characters and grahic images by transferring thermoplastic magnetic ink onto a transfer medium by means of heat and magnetism that overcomes the disadvantages of prior art imprinting apparatus.

SUMMARY OF THE INVENTION

Generally speaking, in accordance with the invention, an imprinting apparatus having means for applying thermal energy to a recording portion of thermoplastic magnetic ink and means for simultaneously generating magnetic attraction force in the recording portion ink is provided. A melted recording portion ink is transferred onto a transfer medium by the application of a magnetic attraction force while controlling the application of thermal energy used to melt the ink. The ink and the transfer medium only come into contact with each other in the recording portion and do not come into contact with each other in the non-recording portion.

Since the imprinting onto the transfer medium is substantially completely performed simultaneously with the application of thermal energy to the ink, the process of tearing the non-recording portion ink off the transfer medium is unnecessary. Thus, there are no forces which inhibit the transfer, such as transfer inhibiting forces $F_C$ and $F_D$. Therefore, the transfer is performed completely.

Since the ink medium and the transfer medium are not in contact with each other, the recording portion ink is transferred independently of the shape of the transfer medium. Therefore, normally formed recording dots can be obtained even on transfer paper having inferior or rough surface smoothness. High resolution recording dots with small areas can also be recorded efficiently.

Furthermore, since the non-recording portion ink and transfer medium are never in contact with each other, no print stain is produced. Additionally, no heat loss due to heat conduction from the ink medium to the transfer medium is observed.

It is, therefore, an object of the present invention to provide an imprinting apparatus that can provide normally formed dots on transfer paper having inferior surface smoothness.

It is another object of the invention to provide an imprinting apparatus which can provide normally formed dots on film having minimal affinity for ink.

It is yet another object of the invention to provide an imprinting apparatus in which print stain can be prevented.

It is a further object of the invention to provide an imprinting apparatus in which heat loss can be reduced.

It is a still further object of the invention to provide an imprinting apparatus in which normally formed high resolution recording dots can be provided.

It is yet a further object of the invention to provide a method of forming normal dots on transfer paper having inferior surface smoothness without print stain or heat loss.

Still other objects and advantages of the invention will in part be obvious and will in part be apparent from the specification.

The invention accordingly comprises the apparatus embodying the features of construction, combinations of elements and arrangements of parts, and the several steps and the relation of one or more of such steps with respect to each of the others, all as exemplified in the following detailed disclosure, and the scope of the invention will be indicated in the claims.

DESCRIPTION OF THE DRAWINGS

For a fuller understanding of the invention, reference is had to the following description taken in connection with the accompanying drawings, in which:

FIGS. 5(c)-1 through 5(c)-4 show two alternative routes of transferring recording portion magnetic ink from an ink medium to a transfer medium;

FIG. 16(c) is an alternate embodiment of an imprinting apparatus constructed and arranged in accordance with the invention;

FIG. 16(d) is a schematic diagram of another alternate embodiment of an imprinting apparatus constructed and arranged in accordance with the invention;

FIG. 16(e) is a schematic diagram of another alternate embodiment of an imprinting apparatus constructed and arranged in accordance with the invention;

FIG. 16(f) is a schematic diagram of yet another imprinting apparatus constructed and arranged in accordance with the invention;

FIGS. 19(a) through 19(c) are side elevational views of ink media of the invention;

FIG. 20 is a schematic diagram of an imprinting apparatus constructed and arranged in accordance with the invention;

FIG. 27 is a schematic diagram of a contact type printing apparatus for use with the ink media of the invention;

FIG. 28 is a schematic diagram of a non-contact type printing apparatus for use with the ink media of the invention;

FIG. 29 is a side elevational view of a thermoplastic magnetic ink medium for comparison with the ink media of the invention;

DETAILED DESCRIPTION OF THE PREFERRED EMBODIMENTS

Figure 1:
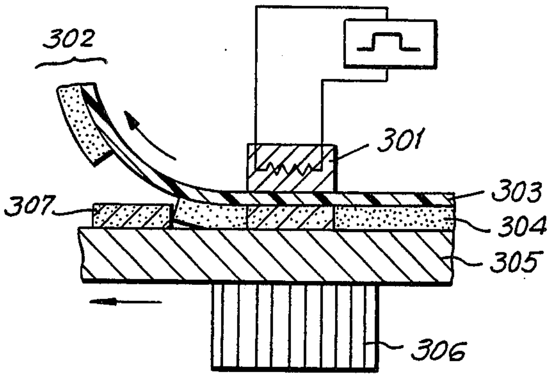
FIG. 1 PRIOR ART
FIG. 1 is a schematic diagram showing the arrangement of a conventional imprinting apparatus.

The present invention is directed to an apparatus and method for transferring thermoplastic magnetic ink onto a transfer medium wherein thermal energy is applied simultaneously with the application of a magnetic attraction force to the recording portion ink. The application of the magnetic attraction force increases the probability that the melted ink will adhere to the transfer medium, e.g. transfer paper, and also increases the rate of transfer of the ink onto the transfer medium at the time the ink is separated from the base film of the ink medium. By using the apparatus and method of the present invention, reproduction of high quality characters and graphic images can be achieved even on rough paper having inferior surface smoothness.

The non-recording portion thermoplastic magnetic ink does not come into contact with the transfer medium. Only the recording portion thermoplastic magnetic ink, which is activated by heat and transferred by the magnetic attraction force, makes such contact with the transfer medium. Accordingly, the process of tearing the non-recording portion ink from the transfer medium is avoided.

Generally known thermal heads can be used as the means for applying thermal energy to the recording portion of thermoplastic magnetic ink in the imprinting apparatus of the invention. In carrying out the invention, it is preferable for the thermoplastic magnetic ink to be provided as a uniform layer on the surface of a base film formed of a heat-resistant resin. Electromagnets, permanent magnets and the like can be used as the means for generating a magnetic attraction force.

Energy can be applied to the ink time-divisionally, that is, two or more times per recording dot transferred.

Thermal bias, i.e. heat, can be applied to the ink medium, the transfer medium or both before, after, or both before and after ink transfer. Additionally, transferred recording dots on the transfer medium can be thermally rolled using a heat roller so as to enlarge their surface area after the thermal energy is applied.

It is preferable to provide uneven portions on the surface of the thermoplastic magnetic ink layer of the ink medium for use in the imprinting apparatus of the invention. When a thermal head is used as the means for applying thermal energy to the ink, the mean pitch of the uneven portions is preferably selected so as to be within the pitch of the electrodes of the thermal head. For example, when the pitch of the electrodes is 8 counts/mm, the pitch of the uneven portions of the ink layer is preferably about 150 μm.

An overcoat layer can be provided on the thermoplastic magnetic ink layer. Alternatively, an undercoat layer can be provided between the base film and the thermoplastic magnetic ink layer of the ink medium.

A closed magnetic circuit can be formed using a magnetic material so as to use leakage magnetic flux, magnetic field or magnetism to generate a magnetic attraction force in the thermoplastic magnetic ink. It is preferable to form a discontinuous protrusion at a part of the magnetic material in the closed magnetic circuit so as to obtain the leakage magnetism. In particular, leakage magnetism produced as a discontinuous part of the magnetic material in the closed magnetic circuit can provide a strong magnetic attraction force. Furthermore, the use of leakage flux at an edge portion can provide additional strong magnetic attraction force.

Figure 5A:
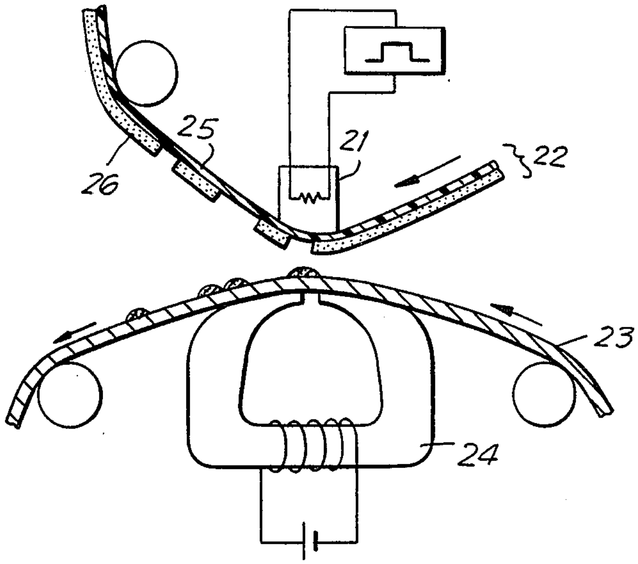
FIG. 5(a) is a schematic diagram showing an imprinting apparatus constructed and arranged in accordance with the present invention.
Figure 5B:
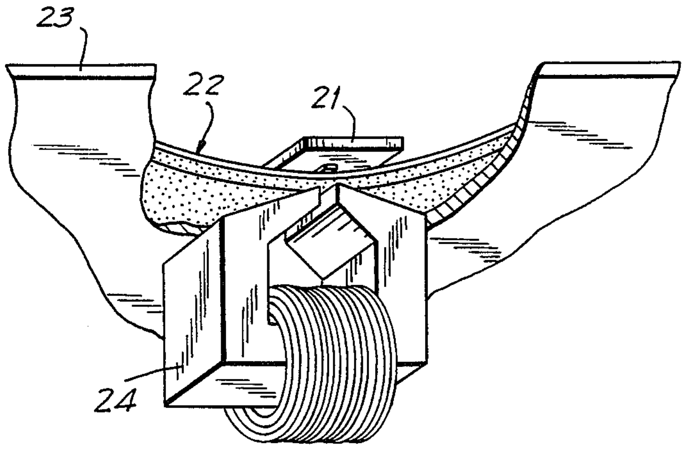
FIG. 5(b) is a perspective view of an electromagnet for use in an imprinting apparatus of the invention.

In a first preferred embodiment of the invention, an electromagnet is used as the means for generating magnetic attraction force. An imprinting apparatus in accordance with the invention is shown in FIGS. 5(a) and 5(b) which includes a thermal head 21, an ink medium 22 having an ink medium support layer or base film 25 and a thermoplastic magnetic ink 26, transfer paper 23 and an electromagnetic head 24. As can be seen in the drawings, thermoplastic magnetic ink 26 of ink medium 22 is not in contact with transfer paper 23.

As shown in FIGS. 5(c)-1, 5(c)-2, 5(c)-3 and 5(c)-4, it is desirable for the length of the attraction portion of the electromagnetic head, A, to be larger than the length of a row of thermal elements, that is, the length of an imprinting portion of the thermal head. This permits the magnetic attraction force generated by the electromagnet 24 to act uniformly on the recording portion 26a of the thermoplastic magnetic ink 26.

Figure 2:
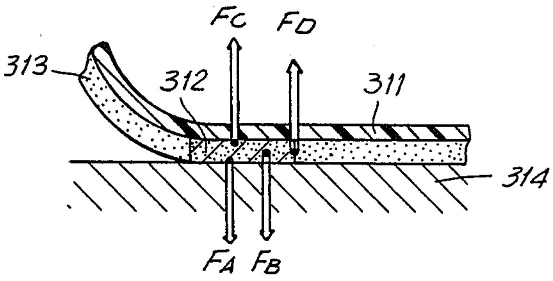
FIG. 2 PRIOR ART
FIG. 2 is an enlarged schematic diagram showing the forces acting on thermoplastic magnetic ink in a conventional imprinting apparatus.
Figure 4:
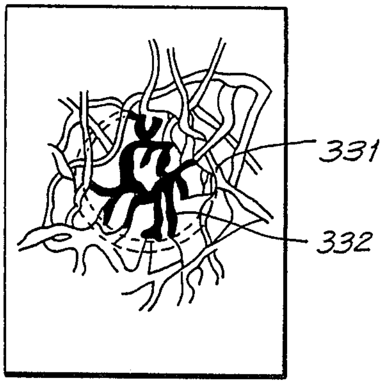
FIG. 4 is a top plan view showing a recorded ink dot on transfer paper having a rough surface.
Figures 1, 2, 3, 5C:
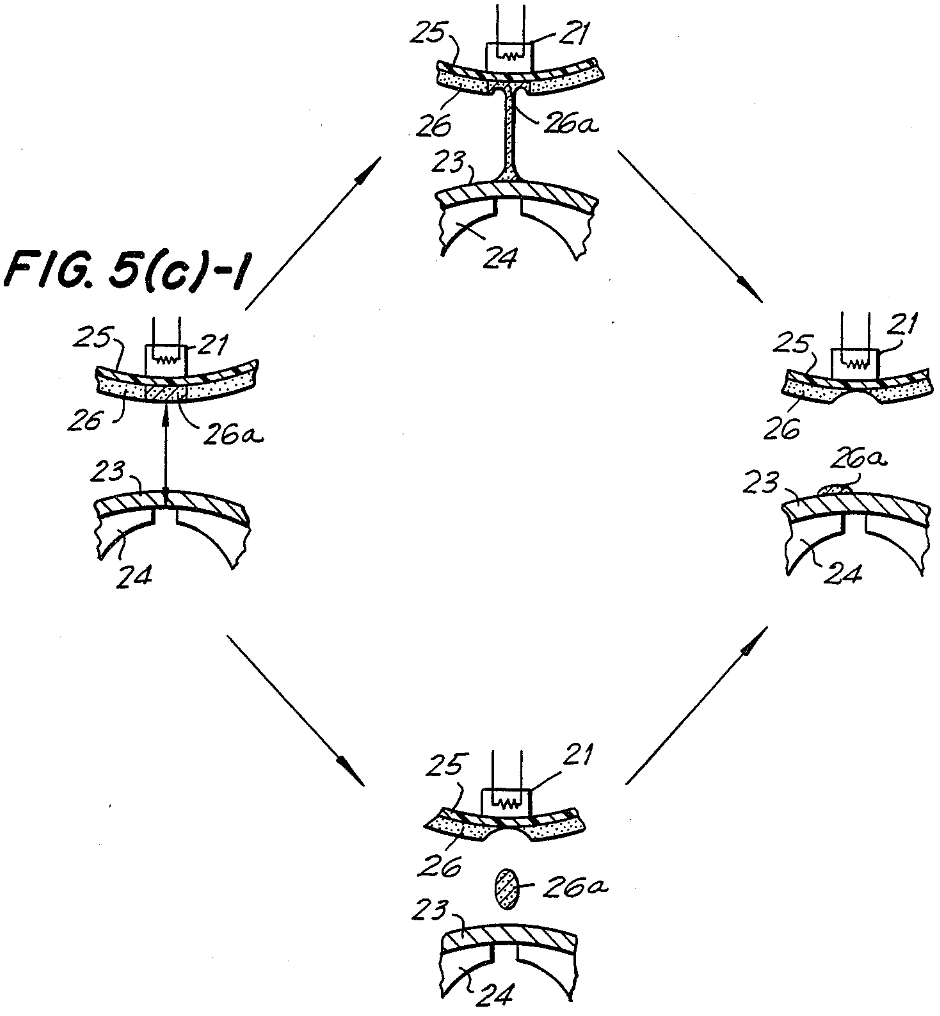

FIGS. 5(c)-1 to 5(c)-4 show two different mechanisms for recording. Recording portion 26a of magnetic ink 26 is heated by thermal head 21 so as to correspond to picture signals, as shown in FIG. 5(c)-1. As shown in FIG. 5(c)-2, recording portion magnetic ink 26a is attracted to transfer paper 23 by electromagnet 24 and the recording portion ink 26a is transformed to an elongated band extending from ink layer 26 to transfer paper 23. The elongated band of recording portion magnetic ink 26a then separates from base film 25 and preferentially adheres to transfer paper 23, as shown in FIG. 5(c)-4.

Figure 3:
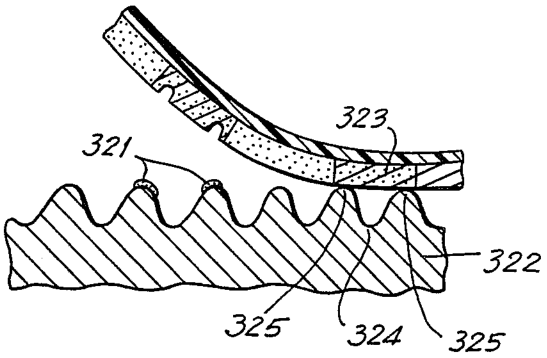
FIG. 3 is a still further enlarged schematic diagram showing thermoplastic magnetic ink in contact with a transfer medium having a rough surface.

Alternatively, the mechanism for recording shown in FIG. 5(c)-3 may be used. According to this mechanism, recording portion ink 26a is separated from ink layer 26 on base film 25 and is "flown" from ink layer 26 to transfer paper 23 as a result of magnetic attraction force acting on the melted recording portion ink 26a. Transfer is completed when recording portion ink 26a lands on and is adhered to transfer paper 23, as shown in FIG. 5(c)-4.

Experimental observation has shown that the configuration shown in FIG. 5(c)-4 can be obtained from the configuration shown in FIG. 5(c)-1 by either one of the mechanisms shown in FIG. 5(c)-2 or FIG. 5(c)-3, but that both mechanisms of recording portion ink transfer are not observed for any one transfer of recording portion ink. However, either mechanism provides excellent imprinting quality. According to these transfer mechanisms, the defective transfer that often arises in conventional contact type magneto-thermal transfer does not occur. In particular, the form of the imprinted dots is circular or elliptical and has excellent reproducibility. This is due to the fact that the thermoplastic magnetic ink and the transfer paper are only in contact with each other during or after transfer of recording portion ink. There is no need to separate the non-recording portion ink from the transfer paper.

Sectional views showing relevant portions of the electromagnetic heads of this embodiment are shown in FIGS. 5(d), 5(e), 5(f) and 5(g). Core 29 has narrow top end portions 29'. Core 29 is constructed of high permeability material. Typical examples of suitable high permeability materials include, but are not limited to, iron (Fe), iron-silicon (Fe-Si), iron-nickel (Fe-Ni), manganese-zinc ferrite (Mn-Zn ferrite), nickel-zinc ferrite (Ni-Zn ferrite) and the like. In an especially preferred embodiment, it is particularly effective to use a high saturation flux density material for the top end portions 29' of core 29. Such high saturation flux density materials include, but are not limited to, iron-cobalt (Fe-Co) and the like.

Figure 6A:
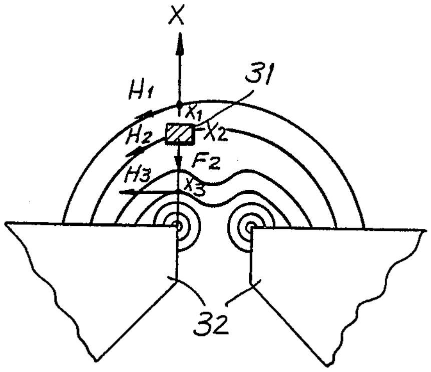
FIG. 6(a) shows the distribution of a magnetic field in the top end portion of an electromagnetic head.
Figure 6B:
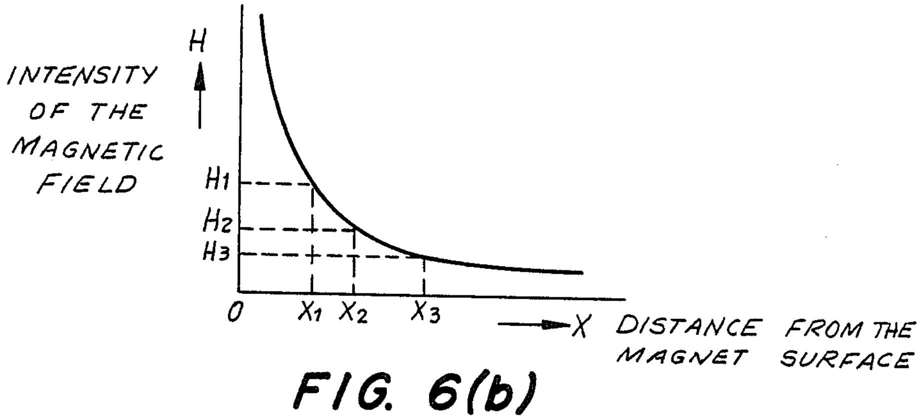
FIG. 6(b) is a graph showing the intensity of a magnetic field as a function of the distance from the surface of a magnet.

FIG. 6(a) shows the distribution of a magnetic field in the top end portion of the core of the electro-magnetic head. FIG. 6(b) shows an attenuation curve of intensity of the magnetic field taken in the X direction of FIG. 6(a). In both FIGS. 6(a) and 6(b), $X_i$ wherein i is an integer, denotes the distance from the surface of the magnet and $H_i$ denotes the intensity of the magnetic field. A thermoplastic magnetic recording portion ink 31 is attracted toward electro-magnetic head 32 by a magnetic attraction force F.

In general, magnetic attraction force F is expressed by the formula;

$$F=M\times(2\times H)/(2\times X)$$

wherein M represents the intensity of magnetization and $(2\times H)/(2\times X)$ represents the magnetic field gradient taken in the X direction. As can be seen, $F_i$ is an inverse function of $X_i$, the distance from the magnet surface.

As indicated in FIG. 6(b), the strength of the magnetic attraction force is in the order $F_3$ $(X_3)<F_2$ $(X_2)<F_1$ $(X_1)$ wherein $X_3$ is closest to the magnet surface and $X_1$ is farthest away. In order to permit the heated recording portion ink to have fluidity, that is, to be transformed as shown in FIG. 5(c)-2 or "flown" as shown in FIG. 5(c)-3, the magnetic attraction force must be over the fluidity threshhold. The fluidity threshhold depends on the intensity of magnetization produced by the electromagnetic head and the fluid characteristics of the particular ink composition when the ink is melted.

As determined by experimental observation, it is preferable for the gap between the top end portions of the core, that is, the distance B as shown in FIGS. 5(d), 5(e), 5(f) and 5(g), to be less than about 1000 μm. In a more preferred embodiment, the distance B is less than about 500 μm.

In addition, it is preferable for the distance between the electromagnetic head and the magnetic ink, that is, the distance A as shown in FIGS. 5(c)-1, 5(d), 5(e), 5(f) and 5(g) to be less than about 1000 μm. More preferably, A is less than about 500 μm.

The magnetomotive force as determined by multiplying N, the number of turns of winding, by I, the electric current through the turns, is preferably greater than about 500. More preferably, the magnetomotive force is greater than about 1000.

Figure 5D:
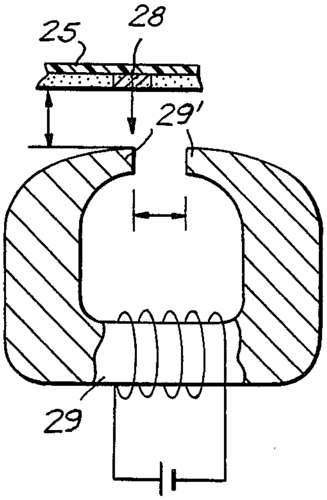
FIGS. 5(d) through 5(g) are sectional views showing electromagnetic heads adapted to be used in the imprinting apparatus of the invention.
Figure 5E:
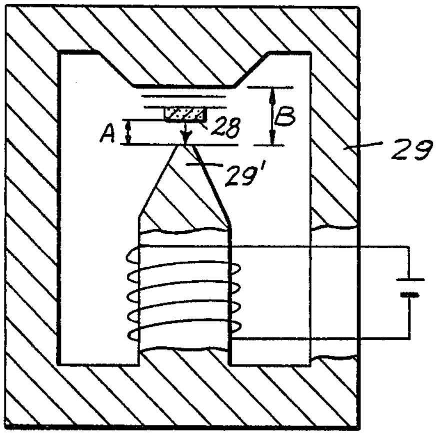
Figure 5F:
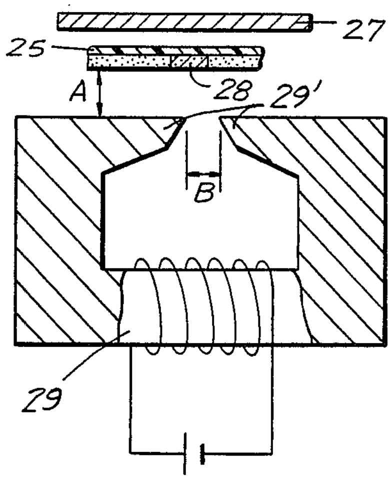
Figure 5G:
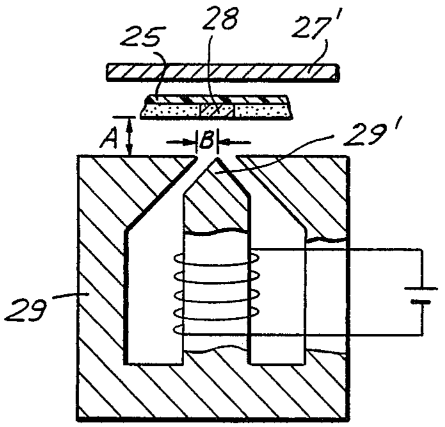

As shown in FIGS. 5(f) and 5(g), an auxiliary magnetic pole 27 can be provided on the side of base film 25 of ink medium 28, that is, at the position opposite electromagnetic head 29. Auxiliary magnetic pole 27 increases the magnetic attraction force acting on the recording portion ink 28 because the magnetic field gradient at the position of recording portion ink 28 is increased by magnetic pole 27. A high permeability material or high saturation flux density material is preferably used to construct auxiliary magnetic pole 27.

This embodiment of the invention will be more clearly understood with reference to the following examples. These examples are presented for purposes of illustration only and are not intended to be construed in a limiting sense.

EXAMPLE 1

An electromagnetic head of the type shown in FIG. 5(d) was used as a magnetic attraction means. The electromagnet had a permendur (Co 50) core. Magnetomotive force, NI, was 3000 and the gap B at the top end portion of the core of the electromagnetic head was 400 μm.

A thin film thermal head having a resolution of 180 DPI was used to apply heat to the recording portion ink.

The ink medium was constructed using a 4 μm thick base film of polyethylene terephthalate (PET) coated with 6 μm of magnetic ink by a hot melt method. The components of the magnetic ink were as follows:

TABLE 5

| SUPPORT | Polyethylene terephthalate | | | | | | Polyimide | | | | | |
|---|---|---|---|---|---|---|---|---|---|---|---|---|
| ESTIMATION | Transfer efficiency | | | Dot reproducibility | | | Transfer efficiency | | | Dot reproducibility | | |
| TRANSFER PAPER | 30" | 10" | 3" | 30" | 10" | 3" | 30" | 10" | 3" | 30" | 10" | 3" |
| Example 35 | 100 | 100 | 94 | 100 | 100 | 96 | 100 | 100 | 95 | 100 | 100 | 95 |
| Example 36 | 100 | 100 | 93 | 100 | 100 | 92 | 100 | 100 | 92 | 100 | 100 | 91 |
| Example 37 | 100 | 100 | 95 | 100 | 100 | 98 | 100 | 100 | 95 | 100 | 100 | 97 |
| Example 38 | 100 | 100 | 93 | 100 | 100 | 94 | 100 | 100 | 91 | 100 | 100 | 95 |
| Example 39 | 100 | 65 | 40 | 100 | 70 | 55 | 100 | 60 | 40 | 100 | 75 | 50 |
| Example 40 | 55 | 35 | 25 | 50 | 40 | 30 | 60 | 40 | 25 | 55 | 40 | 25 |
| Example 41 | 50 | 60 | 75 | 55 | 60 | 80 | 50 | 65 | 78 | 50 | 52 | 75 |

$$\text{Transfer efficiency} = \frac{\text{Transfer area per dot of print sample}}{\text{Thermal area per dot of thermal head}}$$

$$\text{Dot reproducibility} = \frac{\text{Transfer dot quantity per one character}}{\text{Thermal dot quantity per one character}}$$

The magnetic ink had a melting point of 70° C.±5° C.

FIG. 5(a) shows the arrangement of the imprinting system of this example. As discussed, the system includes thermal head 21, ink medium 22 having PET film 25 and a thermoplastic magnetic ink 26, transfer paper 23 having Beck smoothness of 2 sec. and an electromagnetic head 24.

The thickness of transfer paper 23 was 100 μm. The gap A between the electromagnetic head 24 and ink 26 was 200 μm. Accordingly, it is clear that ink 26 did not come into contact with transfer paper 23.

Ink was transferred upon application of thermal energy in an amount of 0.5 mJ/dot. The transfer efficiency was about 85%. The imprinting conditions and estimation of transfer efficiency are shown in Table 1.

TABLE 1

Imprinting Condition and Estimation of Ink Transfer

| | IMPRINTING CONDITION | | | |
|---|---|---|---|---|
| | 1 Thermal application energy | 2* Gap A between electromagnet head and ink | TRANSFER EFFICIENCY | ESTIMATION |
| Example 1 | 0.5 mJ | 200 μm | 85% | ○ |
| Example 2 | 0.7 mJ | 200 μm | 95% | ◎ |
| Example 3 | 0.4 mJ | 150 μm | 95% | ◎ |
| Example 4 | 0.5 mJ | 200 μm | 90% | ○ |
| Example 5 | 0.5 mJ | 100 μm | 60% | X |
| Example 6 | 0.7 mJ | 100 μm | 70% | Δ |

*The thickness of the transfer paper was 100 μm.

Figure 7:
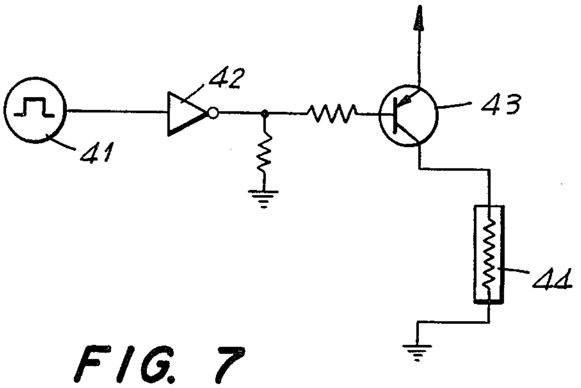
FIG. 7 is a circuit diagram for a circuit adapted to be used in an imprinting apparatus of the invention.

The circuit diagram for the circuit used in this example is shown in FIG. 7. Pulses generated by pulse generating portion 41 were inverted by invertor 42. The inverted pulses were applied to the base of transistor 43. Energy was applied to thermal head heating resistor 44 for each dot to be transferred.

The estimation of transfer efficiency is expressed as the percentage of the amount of ink transferred to the amount of recording portion ink in the thermal element area of the thermal head. The amount of recording portion ink is determined by multiplying the surface area of the thermal head by the thickness of the ink.

EXAMPLE 2

Ink transfer was accomplished as described in Example 1, except that thermal energy was applied in an amount of 0.7 mJ/dot. Transfer efficiency was 95%. These results are shown in Table 1 above.

EXAMPLE 3

Ink transfer was accomplished as described in Example 1 except that NI, i.e. the magnetomotive force of the electromagnetic head, was increased to 5000. Thermal energy was applied in an amount of 0.4 mJ/dot and the gap A between the electromagnetic head and the ink was reduced to 150 μm. Transfer efficiency was 95%. These results are shown in Table 1 above.

EXAMPLE 4

Ink transfer was accomplished as described in Example 1, except that the gap B at the top end portion of the electromagnet was decreased to 300 μm. Accordingly, transfer efficiency was raised to 90% as shown in Table 1 above and as compared with the transfer efficiency of Example 1.

EXAMPLE 5

(for comparison)

Ink transfer was accomplished as described in Example 1, except that the magnetic ink and the transfer paper were in contact with each other under the thermal head at the time thermal energy was applied. As can be seen in Table 1 above, the transfer efficiency decreased significantly to 60%.

EXAMPLE 6

(for comparison)

Ink transfer was accomplished as described in Example 1 under the imprinting conditions described in Example 2 except that the magnetic ink and the transfer paper were in contact with each other under the thermal head at the time thermal energy was applied. As shown in Table 1 above, transfer efficiency decreased significantly to 70%.

In a second preferred embodiment of the invention, a permanent magnet is used as a means of applying magnetic attraction force. FIGS. 8(a) and 8(b) depict sectional views of two different permanent magnet heads. In a preferred embodiment, permanent magnet 57 has a large maximum energy product. Typical examples of permanent magnets for use in the apparatus of the invention include, but are not limited to, alnico magnets, barium-ferrite magnets, and rare earth magnets in which the maximum energy product ($(BH)_{max}$) is greater than about 10 MGOe.

Yoke 59 has narrow top end portions 59'. A high permeability material is used for the yoke. Typical examples of such materials include, but are not limited to, iron (Fe), iron-silicon (Fe-Si), iron-nickel (Fe-Ni), maganese-zinc ferrite (Mn-Zn ferrite), nickel-zinc ferrite (Ni-Zn ferrite) and the like. It is especially effective for a high saturation flux density material to be used for top end portions 59' of yoke 59. Suitable high saturation flux density materials include, but are not limited to, iron-cobalt (Fe-Co) and the like.

The gap, B, between the top end portions of the permanent magnet is preferably between about 100 and 1000 um.

The distance, A, between the permanent magnet head 59 and the thermoplastic magnetic ink 58 is less than about 1000 um. Accordingly, recording portion magnetic ink 58 is at a position having a large magnetic field gradient produced by leakage flux from top end portions 59' of permanent magnet 59.

In the permanent magnet shown in FIG. 8(a), the magnetic attraction force is in the direction perpendicular to the direction of magnetic flux. In the alternate permanent magnet head shown in FIG. 8(b), the magnetic attraction force is in the direction parallel to the direction of magnetic flux.

This embodiment of the invention will be described with reference to the following examples. These examples are presented for purposes of illustration only and are not intended to be construed in a limiting sense.

EXAMPLE 7

A permanent magnet head 59 of the type shown in FIG. 8(a) was used as a means for generating magnetic attraction force. Permendur (Co 50) was used as the yoke material of permanent magnet 59. In particular, the permanent magnet was of the Sam type having $(BH)_{max}$ equal to 20. The gap, B, at the top end portion 59' of the head was 200 μm.

A thin film thermal head having a resolution of 180 DPI was used as a means of heat application.

The ink medium was prepared as described in Example 1.

Figure 8:
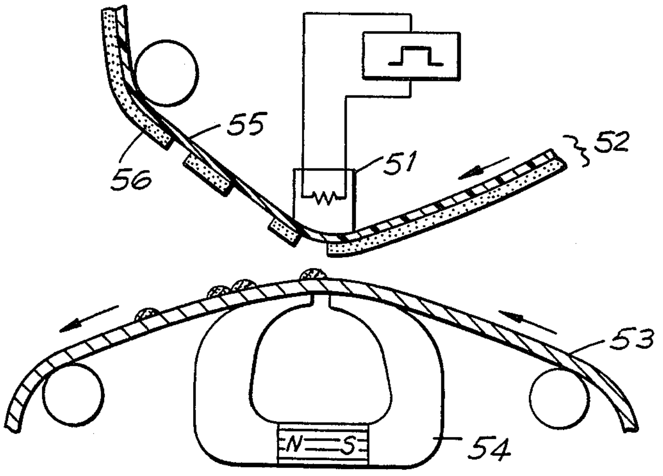
FIGS. 8(a) and 8(b) are sectional views of two different permanent magnet heads adapted to be used in an imprinting apparatus of the invention.
FIG. 8(c) shows an imprinting apparatus constructed and arranged in accordance with the invention.
Figure 8A:
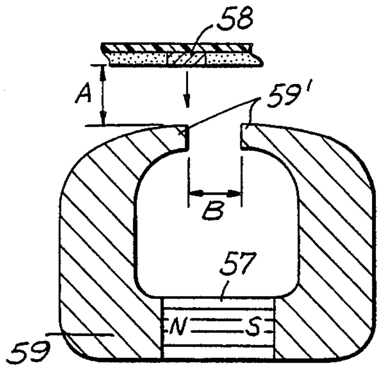
Figure 8B:
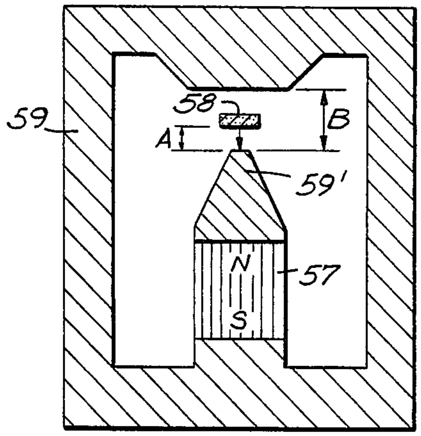

The arrangement of the imprinting apparatus of this example is shown in FIG. 8(c) which includes a thermal head 51, an ink medium 52 having a PET film 55 and thermoplastic magnetic ink 56, a transfer paper 53 having Beck smoothness equal to 2 sec. and a permanent magnet head 54.

The circuit used is represented by the circuit diagram shown in FIG. 7. Imprinting was accomplished in the manner described in Example 1.

Thermal energy was applied in an amount of 0.5 mJ/dot and the gap A between the permanent magnet head and the ink was 150 μm. The thickness of the transfer paper was 100 μm. Accordingly, the ink was not in contact with the transfer paper.

Transfer efficiency was 85% as shown in Table 2.

TABLE 2

Imprinting Condition and Estimation of Ink Transfer

| | IMPRINTING CONDITION | | | |
|---|---|---|---|---|
| | 1 Thermal application energy | 2* Gap A between permanent magnet head and ink | TRANSFER EFFICIENCY | ESTIMATION |
| Example 7 | 0.5 mJ | 150 μm | 85% | O |
| Example 8 | 0.7 mJ | 150 μm | 90% | O |
| Example 9 | 0.4 mJ | 120 μm | 95% | ◎ |
| Example 10 | 0.5 mJ | 150 μm | 90% | O |
| Example 11 | 0.5 mJ | 100 μm | 55% | X |
| Example 12 | 0.7 mJ | 100 μm | 70% | Δ |

*The thickness of the transfer paper was 100 μm.

The estimation of transfer efficiency shown in Table 2 was expressed as the percentage of the amount of the ink transferred as compared to the amount of ink in the thermal element area of the thermal head. The amount of ink in the thermal element area is the surface area of the thermal element head times the thickness of the ink.

EXAMPLE 8

Ink transfer was accomplished in the manner described in Example 7, except that thermal energy was applied in an amount of 0.7 mJ/dot. Transfer efficiency increased to 90%. These results are shown in Table 2 above.

EXAMPLE 9

Ink transfer was accomplished as described in Example 7, except that $(BH)_{max}$ of the permanent magnet head was increased to 30, the amount of thermal energy applied was decreased to 0.4 mJ/dot and the gap A was decreased to 120 μm. Transfer efficiency increased to 95%. These results are shown in Table 2 above.

EXAMPLE 10

Ink transfer was accomplished as described in Example 7, except that the gap, B, at the top end portion of the permanent magnet head was decreased to 150 μm. Transfer efficiency increased to 90% as shown in Table 2 above.

EXAMPLE 11

(for comparison)

Ink transfer was accomplished as described in Example 7, except that the thermoplastic magnetic ink and transfer paper were in contact with each other just under the thermal head at the time of application of thermal energy. The transfer efficiency is significantly reduced to 55% as shown in Table 2 above.

EXAMPLE 12

(for comparison)

Ink transfer was accomplished as described in Example 7 under the imprinting conditions of Example 8, except that the magnetic ink and the transfer paper were in contact with each other just under the thermal head at the time thermal energy was applied. Transfer efficiency was significantly reduced to 70% as shown in Table 2 above.

In a third preferred embodiment of the invention, pulse sharing is used. This embodiment will be described in connection with the following examples. These examples are presented for purposes of illustration only and are not intended to be construed in a limiting sense.

EXAMPLE 13

Figure 9:
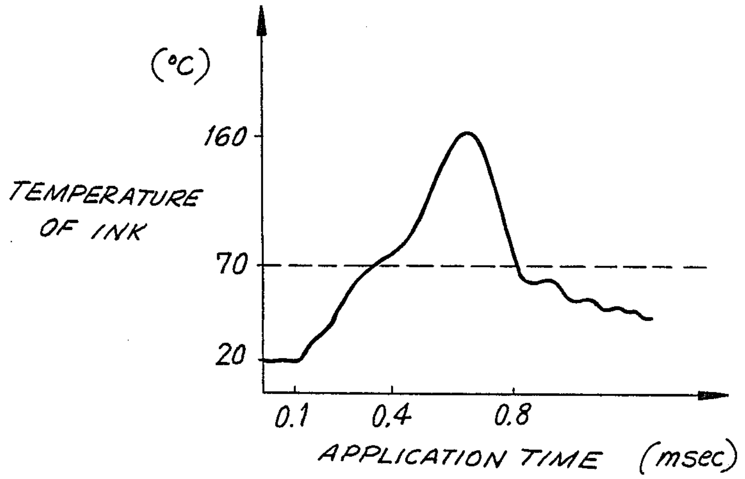
FIG. 9 is a graph showing temperature changes in thermoplastic magnetic ink as a function of time.

FIG. 9 is a graph showing temperature changes in the thermoplastic magnetic ink (°C) of Examples 1–6 as a function of application time of thermal energy by the thermal head (msec). As shown in the graph, the ink temperature begins to rise about 0.1 msec after initiation of a pulse to the thermal head. The ink temperature reached 70° C., the melting point of the ink, after 0.4 msec had elapsed. The temperature reached a peak of about 200° C. after about 1.0 msec had elapsed from initiation of a pulse.

Since imprinting is not feasible before the ink is heated over its melting point, i.e. before the ink is melted, the effective time for printing is the period when the ink temperature is over 70° C. This is a period of about 0.3 msec beginning about 0.4 msec after the application of thermal energy is initiated. This period is referred to as "effective print time".

Figure 10A:
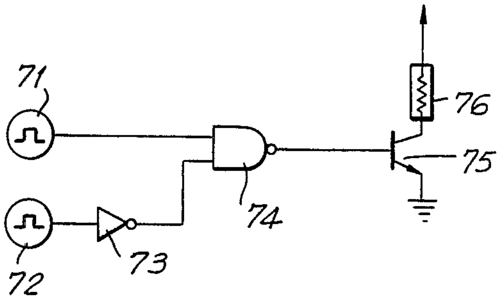
FIG. 10(a) is a circuit diagram for a circuit adapted to be used in an imprinting apparatus of the invention.
Figure 10B:
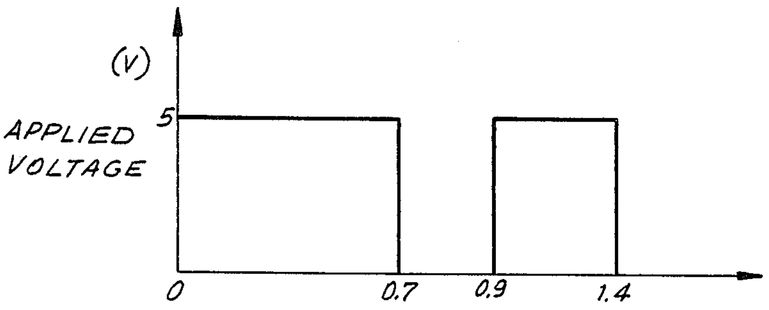
FIG. 10(b) is a graph showing applied voltage as a function of time generated by the circuit of FIG. 10(a)

In order to prolong the effective print time, the circuit shown in FIG. 10(a) was prepared. As shown in FIG. 10(a), pulses are generated by first pulse generating portion 71. Other pulses are generated by second pulse generating portion 72 and are inverted by invertor 73. The inverted pulses and the pulses generated by pulse generating portion 71 are combined by NAND gate 74. The combined pulses are applied to the base of transistor 75 so that voltage is applied to a thermal head heating portion 76. A graph showing the applied voltage as a function of time is shown in FIG. 10(b).

Figure 10C:
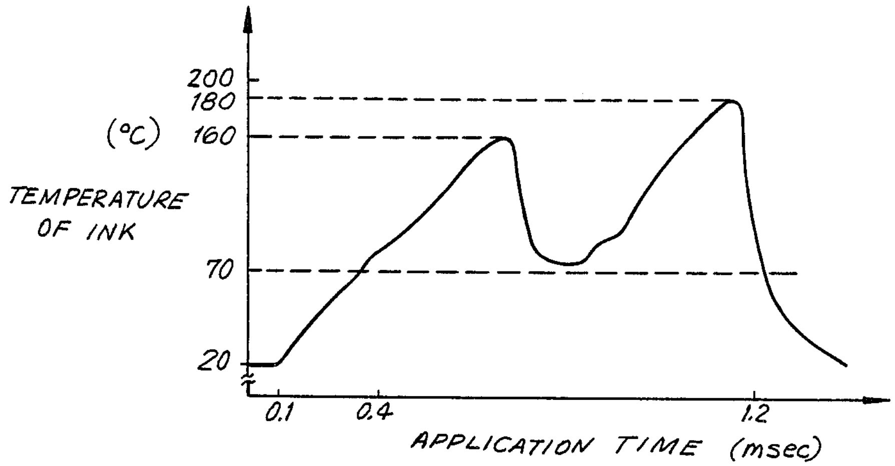
FIG. 10(c) is a graph showing ink temperature as a function of time for ink heated by the circuit of FIG. 10(a)

Temperature changes in the ink as a function of time after initiation of the pulse are shown in FIG. 10(c). All other operating conditions were the same as those shown in Example 1.

As shown in FIG. 10(c), the effective print time was 0.8 msec. Printing was accomplished using these pulses and print dots having higher quality and higher ink concentration than the print dots obtained using the thermal head of Examples 1-6 were achieved.

Figure 11:
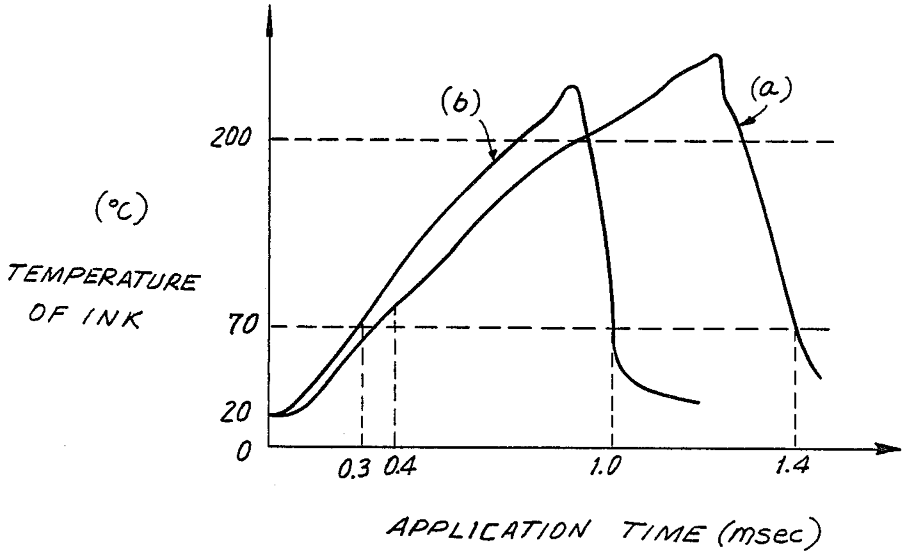
FIG. 11 is a graph showing curves representing the increase in ink temperatures as a function of time for two alternate methods of increasing effective print time.

Other measures for increasing the effective print time were attempted. For example, a method of prolonging pulse application time without pulse sharing was tried. Additionally, a method of increasing only the applied voltage was attempted. Curves showing the temperature of the ink as a function of application time are shown in FIG. 11. Curve (a) represents the method of prolonging pulse application time without pulse sharing and curve (b) represents the method of increasing only the applied voltage. As can be seen, the temperature of the ink exceeded 200° C. in both these cases.

An increase in ink temperature over 200° C., even though the effective print time was prolonged as desired, is unacceptable. When ink temperature exceeds 200° C., the polyethylene terephthalate support layer is softened and transformed. It is also possible for thermal destruction, such as breakage of the ink film layer, to be caused. This is due to the fact that the magnetic attraction force of the magnetite fine grain in the thermoplastic magnetic ink weakens with the rise in temperature. The magnetic attraction force becomes especially weak at temperatures over 200° C.

As can be seen, methods in which the application time or applied voltage is increased without pulse sharing, are unsuitable for printing. However, the method of pulse sharing and pulse combining is suitable for prolonging effective print time.

EXAMPLE 14

Figure 12A:
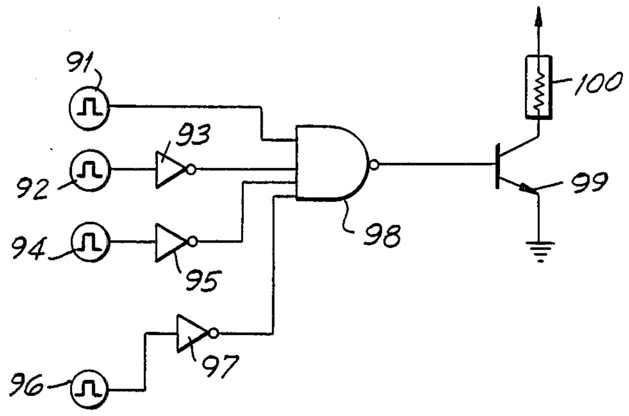
FIG. 12(a) is a circuit diagram for circuit for use in an imprinting apparatus of the invention.

Printing was accomplished using the circuit shown in FIG. 12(a). The timing of pulses of Example 13 was modified so that the energy used for printing was minimized. Additionally, the time during which the temperature of the ink was maintained within the range between the melting point of the ink, about 70° C., and 200° C. was maximized.

Figure 12B:
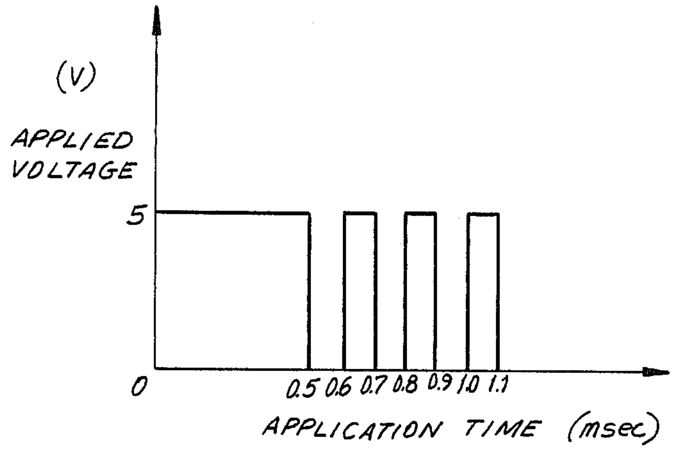
FIG. 12(b) is a waveform generated by the circuit of FIG. 12(a)

As shown in FIG. 12(a), pulses generated by first generating portion 91, by second pulse generating portion 92 which are inverted by first invertor 93, by third pulse generating portion 94 which are inverted by second invertor 95 and by fourth pulse generating portion 96 which are inverted by third invertor 97 are combined by NAND gate 98. The combined pulses are applied to the base of transistor 99 in such a way that voltage is applied to thermal head heating portion 100. The pattern of pulses is shown in FIG. 12(b).

Figure 12C:
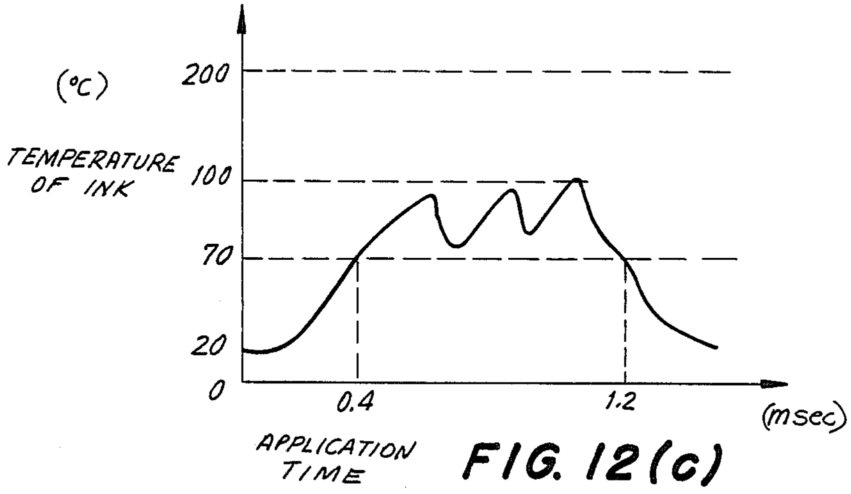
FIG. 12(c) is a graph showing ink temperature as a function of time for the waveform generated by the circuit of FIG. 12(a)

The temperature changes in the ink were recorded as shown in FIG. 12(c) and the effective print time was 0.8 msec. The applied power was $1[w]\times(0.5+0.1\times3)[msec]=0.8$ [mJ]. Printing was accomplished using these applied pulses and print dots of higher quality than the print dots of Example 1 were obtained.

Although particular examples, specifically Examples 13 and 14, have been described, other methods of pulse sharing may be employed as long as printing is feasible.

When the melting point of the ink and the resistance of the heating element of the thermal head are changed, the setting of the applied voltage and shared pulses can be changed accordingly.

The permanent magnet used can be replaced by an electromagnet without changing the beneficial effects of pulse sharing.

In a fourth preferred embodiment of the invention, pulse biasing is used. This embodiment will be described with reference to the following examples. These examples are presented for purposes of illustration only and are not intended to be construed in a limiting sense.

EXAMPLE 15

Figure 13A:
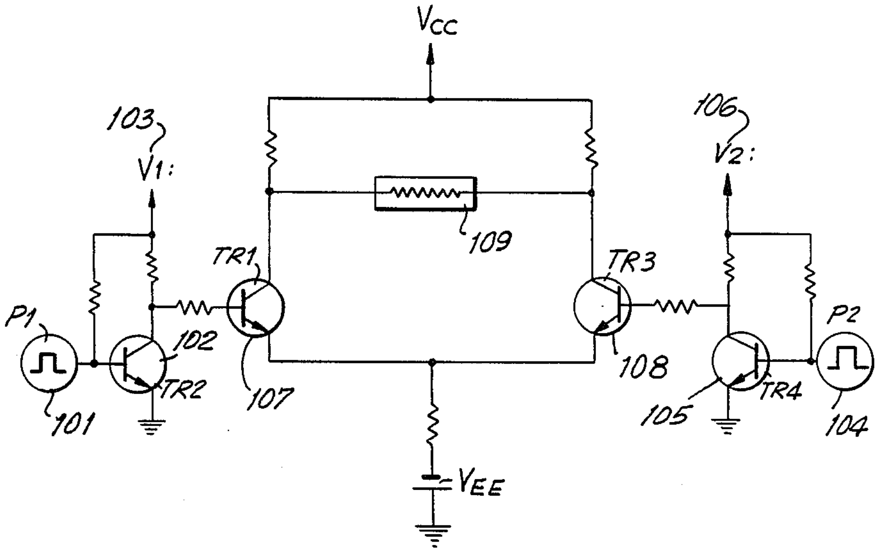
FIG. 13(a) is an alternate circuit diagram for a circuit for use in an imprinting apparatus of the invention.
Figure 13B:
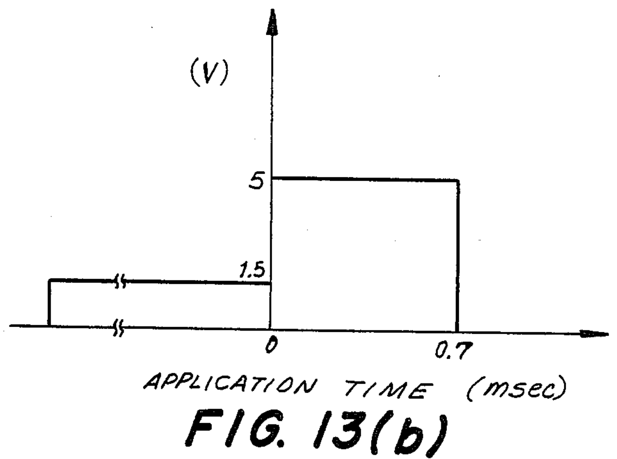
FIG. 13(b) is a waveform generated by the circuit of FIG. 13(a)

In order to prolong the effective print time, the circuit of FIG. 13(a) was prepared. As shown in FIG. 13(a), pulses generated by a pulse generating portion 101 are amplified to an applied voltage ($V_1$) 103 by transistor 102. Other pulses generated from a second pulse generating portion 104 are amplified to an applied voltage ($V_2$) 106 by second transistor 105. These two groups of pulses are respectively applied in the form of differential inputs to two transistors of the same class 107 and 108 in such a way that voltage is applied to thermal head heating portion 109. The waveform of the voltage is shown in FIG. 13(b).

Figure 13C:
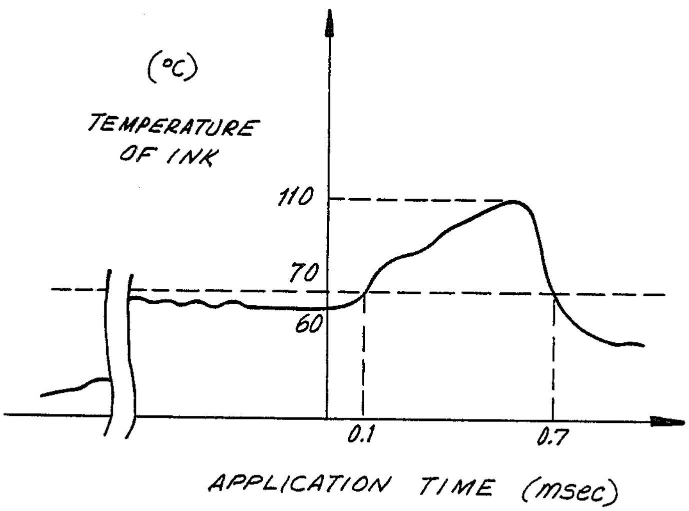
FIG. 13(c) is a graph showing ink temperature as a function of time for the waveform generated by the circuit of FIG. 13(a)

Ink transfer was accomplshed using this form of pulse biasing. Temperature changes in the ink were recorded as shown in FIG. 13(c). According to the method of this example, a low voltage is applied in order to heat the ink to about 60° C., a temperature slightly lower than the melting point of the ink, prior to the application of pulses in order to prolong the effective print time. Consequently, over a period of 0.7 msec, the effective print time was 0.6 msec as shown in FIG. 13(c). High quality print dots were obtained. These print dots were of higher quality than those of Examples 1-6.

EXAMPLE 16

Figure 14A:
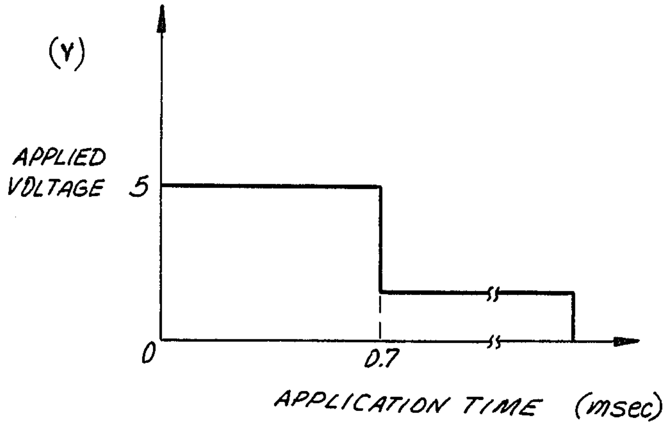
FIG. 14(a) is an alternate waveform generated by a circuit for use in an imprinting apparatus of the invention.
Figure 14B:
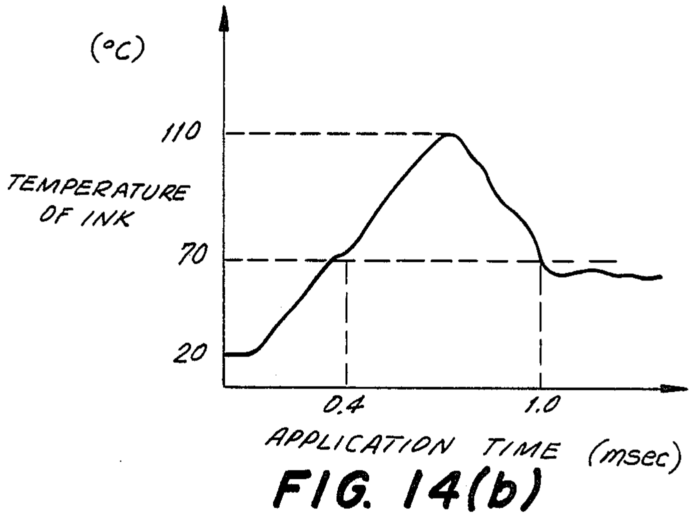
FIG. 14(b) is a graph showing ink temperature as a function of time for the waveform of FIG. 14(a)

Pulses were applied as shown in FIG. 14(a) and then low voltage was applied as shown in Example 15. Temperature changes in the ink as a function of time were recorded as shown in FIG. 14(b). The effective print time was 0.6 msec, which is similar to that shown in Example 15. Transfer printing was effected under these conditions in order to obtain print dots having the same concentration and quality as the print dots of Example 15.

EXAMPLE 17

Figure 15A:
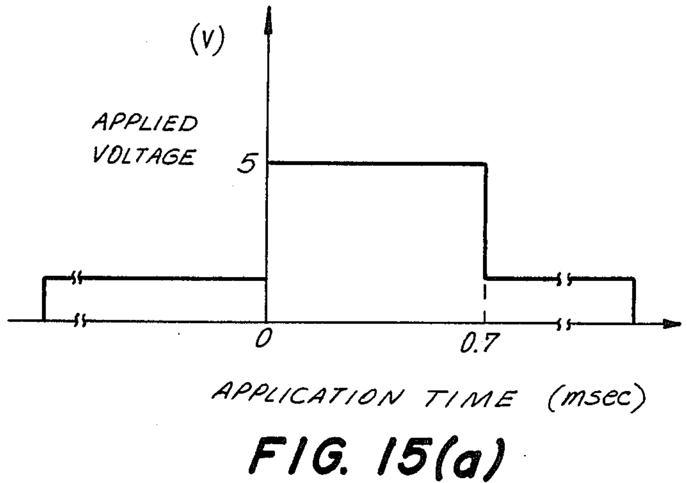
FIG. 15(a) is a waveform generated by a circuit used in an imprinting apparatus of the invention.
Figure 15B:
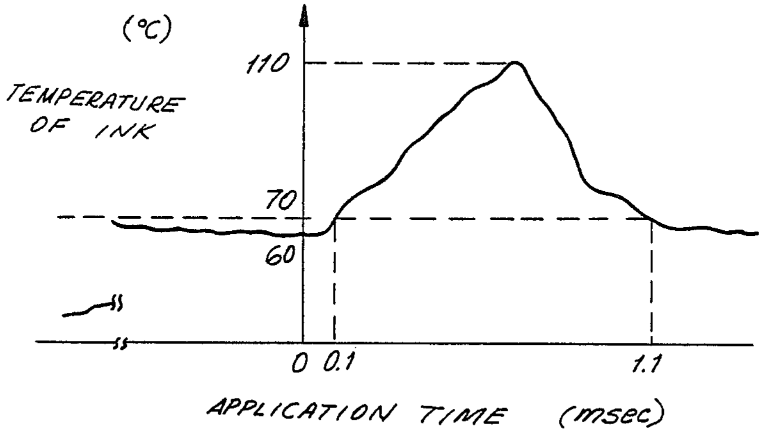
FIG. 15(b) is a graph showing ink temperature as a function of time when the ink is heated by the circuit generating the wave form of FIG. 15(a)

In this example, a combination of the conditions of Examples 15 and 16 was attempted. Specifically, low voltage was applied both before and after the application of pulses as shown in FIG. 15(a). Temperature changes were recorded as shown in FIG. 15(b). The effective print time was 0.65 msec. and print dots having higher concentration and higher quality than the print dots of Examples 15 and 16 were obtained.

Voltage of any quantity and any pulse width may be applied to the thermal head before and/or after pulse application so long as ink transfer remains feasible. Ink transfer conditions other than those shown can also be used.

In a fifth preferred embodiment of the invention, thermal bias is used as an auxiliary means for ink transfer. Thermal bias refers to application of thermal energy from an auxiliary heat supply means and use of heat from the auxiliary heat supply means for ink transfer in addition to use of heat from the thermal heating means described.

This embodiment will be described with reference to the following examples. These examples are presented for purposes of illustration only and are not intended to be construed in a limiting sense.

EXAMPLE 18

Figure 16A:
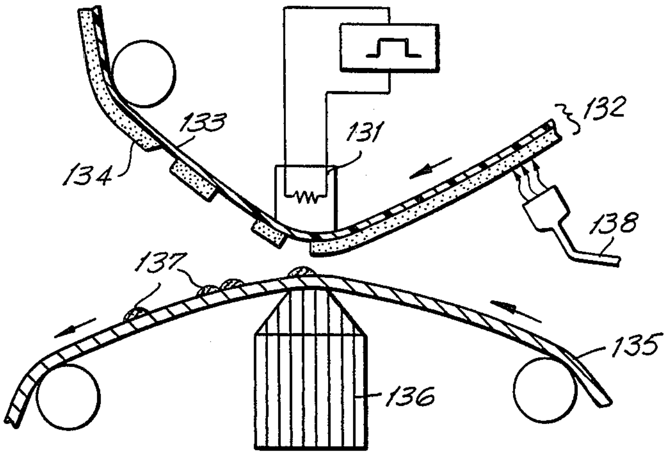
FIG. 16(a) is a schematic diagram showing an imprinting apparatus constructed and arranged in accordance with the invention.

FIG. 16(a) is a schematic view showing the arrangement of elements used in this example. A thermal head was used as the means for application of thermal energy. A permanent magnet was used as means for generating magnetic attraction. A drier-heater 138 was used as means for preheating. During the period when ink was not being transferred, as shown in FIG. 16(a), the ink medium and the transfer paper were not in contact with each other and the distance between the ink medium and the transfer paper just under the thermal head was maintained at 120 μm. The ink medium was the same as that described in Example 1.

A Sam magnet having a maximum energy product of 25.3 MGOe was used as the permanent magnet and permendur of iron-cobalt alloy was mounted on the top end portions of the permanent magnet. The film was preheated by the drier-heater at 600 watts until the surface temperature of the ink film, as measured by a non-contact radiation thermometer, reached 40° C. After the preheating and immediately prior to cooling of the ink film, thermal energy of 0.5 mJ/dot was applied by a thermal head having a resolution of 2000 DPI. The ink surface area corresponding to more than about 80% of the thermal element area, that is, 125 μm by 140 μm, was transferred to the transfer paper. High quality imprinting was performed with a transfer efficiency of 80% or more.

EXAMPLE 19

Figure 16B:
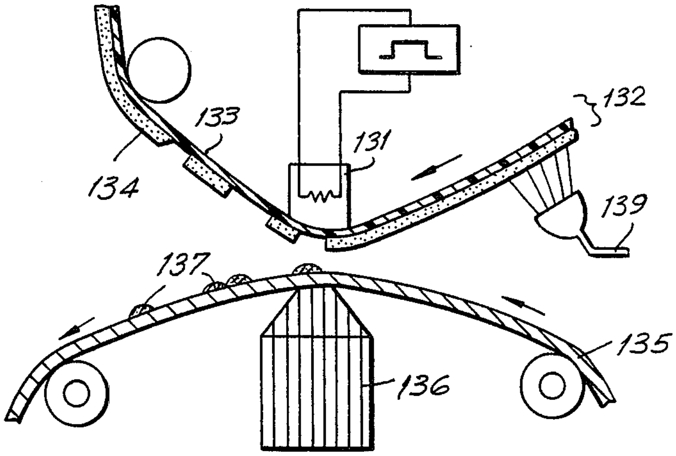
FIG. 16(b) is a schematic diagram of an alternate imprinting apparatus constructed and arranged in accordance with the invention.

The imprinting apparatus, permanent magnet, thermal head combination, ink composition and transfer paper of Example 18 were used. A halogen lamp of 700 watts was used for preheating as shown in FIG. 16(b). The ink film was preheated until the surface temperature reached 40° C. After preheating, thermal energy of 0.5 mJ/dot was applied by the thermal head so that the ink was transferred to the transfer paper with a transfer efficiency of greater than about 90%. High quality imprinting was performed.

EXAMPLE 20

The imprinting apparatus and ink composition of Example 18 were used. A halogen lamp 139 was used as a thermal bias as shown in FIG. 16(c). Both the ink film and the transfer paper were preheated using light irradiation from the halogen lamp until the temperature of the surfaces of both the ink film and the transfer paper reached 40° C. After preheating, thermal energy of 0.5 mJ/dot was applied to the ink by the thermal head. The ink was transferred to the transfer paper with a transfer efficiency of greater than about 90%. Accordingly, high quality imprinting was accomplished in a manner similar to that of Example 19.

EXAMPLE 21

The imprinting apparatus and ink composition of Example 18 were used and a drier-heater 138 was used as a thermal bias. As shown in 16(d), both the ink film and the transfer paper were preheated by the drier-heater 138 until the surface temperatures of both the ink film and the transfer paper reached 40° C. After preheating, thermal energy of 0.5 mJ/dot was applied to the ink by the thermal head. Ink was transferred to the transfer paper with a transfer efficiency of greater than about 80%. Accordingly, high quality imprinting was accomplished.

EXAMPLE 22

The imprinting apparatus and ink composition of Example 18 were used and a drier-heater 138 was used as the means for thermal biasing as shown in FIG. 16(e). After the ink was transferred onto the transfer paper, the transfer paper was immediately heated by the drier-heater until the surface temperature reached 50° C. The ink dots were completely fixed on the transfer paper and the area of the ink dots was expanded by hot melting. The ink was transferred to the transfer paper with a transfer efficiency of greater than about 80%. Accordingly, high quality imprinting was performed.

EXAMPLE 23

The imprinting apparatus and ink composition of Example 18 were used and, as shown in FIG. 16(f), a halogen lamp 139 was used as the means for thermal biasing. After the ink was transferred onto the transfer paper, the transfer paper was immediately heated through light irradiation by the halogen lamp until the surface temperature of the transfer paper reached 50° C. The ink dots were completely fixed on the transfer paper and the area of the dots was expanded by hot melting. The ink was transferred to the transfer paper with a transfer efficiency of greater than about 85%. Accordingly, high quality imprinting was performed.

The results of Examples 18–23 can be summarized as follows:

| EXAMPLE | TRANSFER EFFICIENCY | ESTIMATION |
|---|---|---|
| 18 | 88% | ○ |
| 19 | 95% | ◎ |
| 20 | 95% | ◎ |
| 21 | 85% | ○ |
| 22 | 85% | ○ |
| 23 | 90% | ○ |

EXAMPLE 24

(for comparison)

In this example, the thermoplastic magnetic ink of the ink medium was in contact with the transfer paper at the time of heat application to the ink medium through the base film by the thermal head. After the melted ink stuck on the transfer paper, the ink medium was torn off in order to transfer the ink to the transfer paper. In this example, transfer efficiency was less than about 40% and imprinting quality was inferior.

In a sixth preferred embodiment of the invention a heat roller is used to enlarge the surface area of the transferred ink dots. The embodiment will be described in more detail with reference to the following examples. These examples are presented for purposes of illustration only and are not intended to be construed in a limiting sense.

EXAMPLE 25

Figure 17:
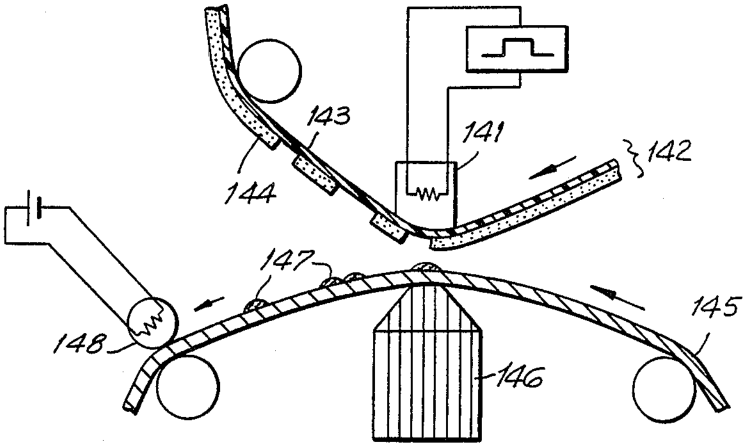
FIG. 17 is a schematic diagram of an alternate embodiment of an imprinting apparatus constructed and arranged in accordance with the invention.

FIG. 17 shows an imprinting apparatus of the invention in which a heat roller having a silicon resin as a surface material is provided. In other respects, the apparatus is substantially the same as that used in Examples 1-6.

The temperature of the heat roller was maintained between about 55° C. and 60° C., a temperature only slightly below the melting point of the ink. Magnetic film having the same ink composition as in Example 1 was used. Energy of 0.5 mJ/dot was applied to the thermal head in order to record dots on the transfer paper. Before the dots cooled, they were rolled by a heat roller at a pressure of 100 g/cm$^2$. Accordingly, dots were recorded on the transfer paper with a transfer efficiency of greater than about 90% and high quality imprinting was performed.

Figure 18:
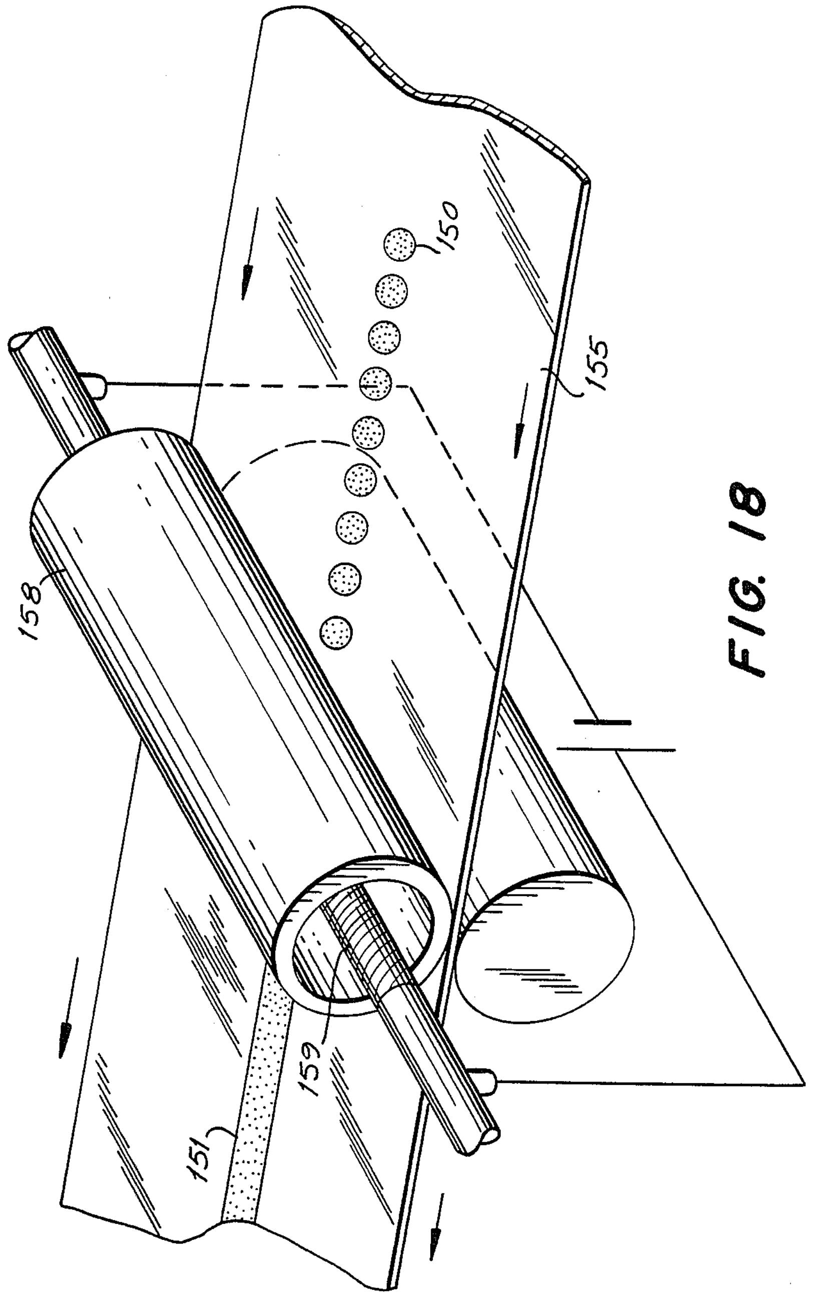
FIG. 18 is a perspective view of a heat roller for use in combination with an imprinting apparatus of the invention.

FIG. 18 shows the detailed construction of the heat roller of this embodiment. Ink dots 150 transferred to transfer paper 155 by a thermal head are rolled by a heat roller 158 having a silicon resin surface material. A halogen lamp 159 of 500 watts is incorporated in heat roller 158 as a heat source. As a result of rolling by the heat roller, the transferred ink dots assume a large surface area so as to be changed into a linearly transferred strip of ink 151.

The method shown in FIG. 18 is also applicable to the following Examples 26-30.

EXAMPLE 26

The imprinting apparatus, transfer paper and heat roller of Example 25 were used. The temperature of the heat roller was maintained between about 55° and 60° C., a temperature just slightly below the melting point of the ink. A magnetic ink film having the same ink composition as that described in Example 1 was also used. Thermal energy of 0.5 mJ/dot was applied by the thermal head in order to record dots on the transfer paper. Before the dots were cooled, they were rolled by a heat roller at a pressure of 75 g/cm$^2$. Accordingly, the dots were recorded on the transfer paper with a transfer efficiency of greater than about 80%. High quality imprinting was performed.

EXAMPLE 27

The imprinting apparatus, transfer paper and heat roller of Example 25 were used. The temperature of the heat roller was maintained between about 55° and 60° C., just slightly below the melting point of the ink. A thermoplastic magnetic ink film having the ink composition of Example 1 was used. Thermal energy of 0.5 mJ/dot was applied by the thermal head in order to record dots on the transfer paper. Before the dots were cooled, they were rolled by a heat roller at a pressure of 60 g/cm$^2$. The dots were recorded on the transfer paper with a transfer efficiency of greater than about 75%.

EXAMPLE 28

The imprinting apparatus, transfer paper and heat roller of Example 25 were used. The temperature of the heat roller was maintained between about 45° and 50° C. Magnetic ink having the ink composition of Example 25 was used. Thermal energy of 0.5 mJ/dot was applied by the thermal head in order to record dots on the transfer paper. Before the dots were cooled, they were rolled by the heat roller at a pressure of 120 g/cm$^2$. The dots were recorded on the transfer paper with a transfer efficiency of greater than about 90%. Accordingly, very high quality imprinting was performed.

EXAMPLE 29

The imprinting apparatus, transfer paper and heat roller of Example 25 were used. The temperature of the heat roller was maintained between about 40° and 45° C. Magnetic ink film having the ink composition of Example 1 was used. Thermal energy of 0.5 mJ/dot was applied by the thermal head in order to record dots on the transfer paper. Before the dots were cooled, they were rolled by the heat roller at a pressure of 120 g/cm$^2$. As a result, dots were recorded on the transfer paper with a transfer efficiency of greater than about 85% and high quality imprinting was performed.

The results of Examples 25-29 can be summarized as follows:

| EXAMPLE No. | HEAT ROLLER Pressure (g/cm$^2$) | HEAT ROLLER Temperature (°C.) | TRANSFER EFFICIENCY (%) | ESTIMATION |
|---|---|---|---|---|
| 25 | 100 | 55-60 | 95 | ◎ |
| 26 | 75 | 55-60 | 88 | ○ |
| 27 | 60 | 55-60 | 85 | ○ |
| 28 | 120 | 45-50 | 95 | ◎ |
| 29 | 120 | 40-45 | 90 | ○ |

EXAMPLE 30

As shown in FIG. 1, thermoplastic magnetic ink in the ink medium was in contact with the transfer paper at the time of heat application by the thermal head through the base film. After the melted ink stuck on the transfer paper, the ink medium was torn from the transfer paper in order to prevent transfer of non-recording portion ink to the paper. Transfer efficiency was less than about 40% and imprinting quality was inferior.

In a seventh preferred embodiment of the invention a rough surface is provided on the ink medium. FIGS. 19(a), 19(b) and 19(c) are enlarged elevational views of important parts of the ink media of this embodiment. Support layer 161 is preferably made of a heat-resistant film. Suitable heat-resistant films include, but are not limited to, polyethylene terephthalate (PET), polyimide, polyamidoimide, polyetheretherketone, polysulfone, polyethersulfone and the like. The thickness of support layer 161 is preferably selected in the range between about 1 μm and 10 μm.

A suitable material is used as a binder for magnetic ink 162. Suitable materials include, but are not limited to, thermoplastic materials containing wax and polymers as main components and having thermoplasticity at a temperature in the range of between about 50° and 250° C. Typical examples of these main components include, but are not limited to, paraffin wax, microcystalline wax, carnauba wax, α-olefin maleic anhydride copolymer, oxidized wax, polyethene wax, fatty acid amide, fatty acid ester, ethylene vinyl acetate copolymer, ethylene-ethyl acrylate, distearylketone and the like.

A ferromagnetic material is contained in the thermoplastic magnetic ink. Suitable ferromagnetic materials include, but are not limited to, magnetic fine grain of magnetite, manganese-zinc ferrite (Mn-Zn ferrite), nickel-zinc ferrite (Ni-Zn ferrite), garnet, a metal, and alloys of iron (Fe), cobalt (Co), nickel (Ni) and the like. The grain size of the ferromagnetic material is between about 10 and 10,000 Å. More preferably, the grain size is between about 500 and 5000 Å. The magnetic ink coverage is preferably in the range between about 5 and 30 g/m$^2$.

The mean pitch, A, of the protrusions or grooves at the uneven portions are selected to be no larger than the pitch of the aligned thermal element. When this type of rough surface ink medium is used in an imprinting apparatus requiring high resolution, the pitch is preferably in the range between about 5 and 150 μm.

The height of the protrusions can be large as compared to the ink coverage in order to extend the surface area. However, the height must be selected to the extent that the efficiency of heat conduction from the support layer is not reduced. Accordingly, the height of the protrusions is preferably in the range between about 1 and 20 μm.

This embodiment will be described with reference to the following examples. These examples are presented for purposes of illustration only and are not intended to be construed in a limiting sense.

EXAMPLE 31

FIG. 19(a) shows the structure of the ink medium of this example. A PET film having a thickness of 4 μm was used as support layer 161.

Ink containing the following components was prepared:

| | |
|---|---|
| Magnetite (grain size 0.2 m) | 50 wt % |
| α-olefin maleic anhydride copolymer | 10 wt % |
| Paraffin wax | 30 wt % |
| Ethylene-ethyl acrylate copolymer | 5 wt % |
| Dyes | 5 wt % |

The ink was prepared with a coverage of 5 g/m$^2$ by gravure hot melt coating. The mean pitch of the protrusions was 50 μm and the mean height was 5 μm.

Ink transfer was accomplished using this ink medium. The arrangement of the imprinting system is shown in FIG. 20. As shown, the system includes a thermal head 171 having a resolution of 180 DPI, an ink medium 172 of the type shown in FIG. 19(a) which has PET film 175 and thermoplastic magnetic ink 176, transfer paper 173 having Beck smoothness of 1 sec and an electromagnetic head 174 for use as means for generating magnetic attraction force.

Thermal energy of 0.7 mJ/dot was applied in order to accomplish the transfer. The magnetomotive force, NI, of the electromagnet was 3000.

Transfer efficiency, expressed as a percentage of the amount of transferred ink to the amount of ink of thermal element area of the thermal head, that is, to the amoūnt of thermal element area times the mean ink thickness, was estimated. Transfer efficiency was 85% as shown in Table 4.

TABLE 4

| | TRANSFER EFFICIENCY (%) | ESTIMATION |
|---|---|---|
| Example 31 | 85 | O |
| Example 32 | 90 | O |
| Example 33 | 95 | ◎ |
| Example 34 | 70 | X |

EXAMPLE 32

FIG. 19(b) shows the structure of the ink medium of this example. The support layer 161 and magnetic ink 162 are the same as those described in Example 31. The mean pitch of the protrusions was 60 μm and the mean height was 20 μm. Ink transfer was performed as described in Example 31. Transfer efficiency was increased to 90% as shown in Table 4 above.

EXAMPLE 33

FIG. 19(c) shows the structure of the ink medium of this Example. The support layer 161 and magnetic ink 162 were the same as those used in Example 31. After magnetic ink layer 162 was prepared by gravure offset hot melt coating, the layer was pressed by a hot roll having an uneven surface. Surface unevenness was formed in this manner. The mean pitch of the protrusions was 30 μm and the mean height was 10 μm. Ink transfer was performed as described in Example 31 and transfer efficiency increased to 95% as shown in Table 4 above.

EXAMPLE 34

(for comparison)

Figure 21:
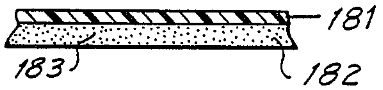
FIG. 21 is a side elevational view of an ink medium used for comparison with ink media of the invention.

FIG. 21 shows the structure of the ink medium of this example. Support layer 181 and magnetic ink 182 were formed of the same materials as those used in Example 31. The magnetic ink layer 182 was prepared by gravure offset hot melt coating. The layer was smooth so that the height of surface unevenness was zero. Ink transfer was performed as described in Example 31. Transfer efficiency was reduced to 70% as shown in Table 4 above.

In an eighth preferred embodiment of the invention, an overcoat layer is provided on the thermoplastic magnet ink medium. The arrangement of the magnetic ink medium of this embodiment is described with reference to FIG. 22 which includes a support layer 191, a thermoplastic magnetic ink layer 192 and an overcoat layer 193.

Support layer 191 is heat-resistant, mechanically strong and smooth. Support layer 191 can be formed of a resin film including but not limited to, polyethylene, polypropylene, polystyrene, polyimide, polyethersulfone, polyethylene terephthalate and the like. Support layer 191 is preferably between about 1 and 30 μm thick. More preferably, support layer 191 is between about 1 and 10 μm.

A binder for overcoat layer 193 and thermoplastic magnetic ink layer 192 is formed from one or more members selected from the thermoplastic organic material group consisting of paraffin wax, microcrystalline wax, carnauba wax, oxidized wax, candelilla wax, montan wax, Fisher-Tropsh wax, polyethylene wax, α-olefin-maleic anhydride copolymer, fatty acid amide, fatty acid ester, distearylketone, ethylene-vinyl acetate copolymer, ethylene-ethyl acrylate copolymer, epoxy resin and the like.

The ferromagnetic material in the thermoplastic magnetic ink binder may be a magnetic fine grain. Suitable magnetic fine grains include, but are not limited to, Mn-Zn ferrite, Ni-Zn ferrite, garnet, a metal, an alloy and the like. The grain size is preferably in the range between about 10 and 10,000 Å. More preferably, the grain size is between about 500 and 5000 Å.

Figure 22:
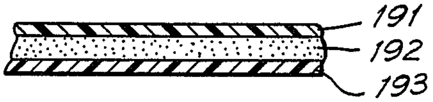
FIG. 22 is a schematic diagram of a contact type printing system used for thermal printing.
Figure 23:
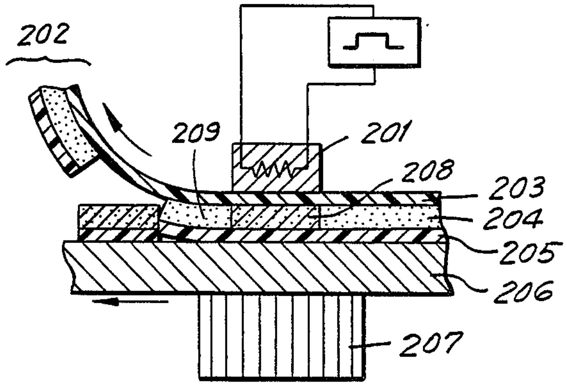
FIG. 23 is a schematic diagram of a contact type imprinting apparatus.

The thermoplastic magnetic ink medium of FIG. 22 was prepared and thermoprinting was performed by a contact type printing system as shown in FIG. 23. Thermal head 201 was used as means for applying thermal energy and permanent magnet 207 was used as means for producing magnetic attraction force. As shown in FIG. 23, depicted is an ink medium 202 having a support 203, thermoplastic magnetic ink 204 and overcoat layer 205, and a transfer paper 206. Overcoat layer 205 is brought into contact with transfer paper 206 just under thermal head 201 at the time of application of thermal energy to ink 204 through support 203 by thermal head 201. Melted ink in recording portion 208 adheres to transfer paper 206. Non-recording portion ink 209 is torn from transfer paper 206. Accordingly, ink transfer is accomplished. Support 203 was formed of polyethylene terephthalate (PET) film and polyimide film. Thermoplastic magnetic ink media were prepared and the overcoat layer composition, viscosity, ink layer composition, overcoat layer thickness, ink layer thickness, and support layer thickness were varied.

Examples of thermoplastic magnetic ink media prepared in accordance with the invention are shown in Examples 35-38. These examples are presented for purposes of illustration only and are not intended to be construed in a limiting sense.

EXAMPLE 35

An ink medium was prepared as follows:

| | |
|---|---|
| Thermoplastic Magnetic Ink Layer | |
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Microcrystalline wax (NHP-3) (produced by NIPPON SEIRO Co. Ltd.) | 70 wt % |
| Carnauba wax (produced by NIKKO FINE PRODUCTS Co. Ltd.) | 23 wt % |
| Ethylene-ethyl acrylate (MB-080) (produced by NIPPON UNICAR Co. Ltd.) | 7 wt % |
| Viscosity - 70 cp (100° C.) | |

A 6 μm thick support layer was coated with a 15 μm layer of the thermoplastic magnetic ink. A 2 μm thick layer of the overcoat composition was coated on the ink.

EXAMPLE 36

An ink medium was prepared as follows:

| | |
|---|---|
| Thermoplastic Magnetic Ink Layer | |
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Paraffin wax (Hi-Mic-2045) (produced by NIPPON SEIRO Co. Ltd.) | 96 wt % |
| Ethylene-vinyl acetate copolymer resin (EVA-410) (produced by DU PONT - MITSUI POLYCHEMICALS Co. Ltd.) | 4 wt % |
| Viscosity - 30 cp (100° C.) | |

A 6 μm thick support layer was coated with a 15 μm layer of the thermoplastic magnetic ink. This is the same magnetic ink composition as the one shown in Example 35. A 2 μm thick layer of the overcoat composition was coated on the ink.

EXAMPLE 37

An ink medium was prepared as follows:

| | |
|---|---|
| Thermoplastic Magnetic Ink Layer | |
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Microcrystalline wax (NHP-3) (produced by NIPPON SEIRO Co. Ltd.) | 70 wt % |
| Carnauba wax (produced by NIKKO FINE PRODUCTS Co. Ltd.) | 23 wt % |
| Ethylene-ethyl acrylate (MB-080) (produced by NIPPON UNICAR Co. Ltd.) | 7 wt % |
| Viscosity - 70 cp (100° C.) | |

A 6 μm thick support layer was coated with a 15 μm layer of the thermoplastic magnetic ink. A 5 μm thick layer of the overcoat composition was coated on the ink. Both the ink layer and the overcoat layer had the same composition as those shown in Example 35. However, the overcoat layer thickness was increased.

EXAMPLE 38

An ink medium was prepared as follows:

| | |
|---|---|
| Thermoplastic Magnetic Ink Layer | |
| Magnetite fine grain (1000 Å) | 40 wt % |
| Paraffin wax (HNP-9) (produced by NIPPON SEIRO Co. Ltd.) | 39 wt % |
| α-Olefin-maleic anhydride (produced by MITSUBISHI CHEMICAL INDUSTRIES Ltd.) | 10 wt % |
| Ethylene-vinyl acetate copolymer resin (EVA-577) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Paraffin wax (145° F.) (produced by NIPPON SEIRO Co. Ltd.) | 90 wt % |
| Ethylene-vinyl acetate copolymer resin (EVA-577) (produced by DU PONT - MITSUI POLYCHEMICALS Co. Ltd.) | 10 wt % |
| Viscosity - 70 cp (100° C.) | |

A 12 μm thick support layer was coated with a 30 μm layer of the thermoplastic magnetic ink. A 2 μm thick layer of the overcoat composition was coated on the ink.

Example 36 differed from Example 35 in overcoat layer viscosity, Example 37 differed in overcoat layer thickness and Example 38 differed in ink layer thickness.

EXAMPLE 39

(for comparison)

Figure 24:
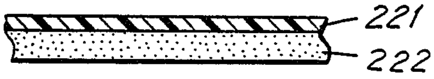
FIG. 24 is a side elevational view of an ink medium used for comparison with the ink media of the invention.

A prior art type thermoplastic magnetic ink medium comprising support layer 221 and thermoplastic magnetic layer 222 was prepared as shown in FIG. 24 as follows:

| Thermoplastic Magnetic Ink Layer | |
|---|---|
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |

A 6 μm thick support layer was coated with a 15 μm layer of the thermoplastic magnetic ink. This ink had the same composition as that shown in Example 35.

EXAMPLE 40

(for comparison)

An ink medium was prepared as follows:

| Thermoplastic Magnetic Ink Layer | |
|---|---|
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Microcrystalline wax (Hi-Mic-1045) (produced by NIPPON SEIRO Co. Ltd.) | 65 wt % |
| Carnauba wax (produced by NIKKO FINE PRODUCTS Co. Ltd.) | 25 wt % |
| Ethylene-ethyl acrytate (MB-080) (produced by NIPPON UNICAR Co. Ltd.) | 10 wt % |
| Viscosity - 200 cp (100° C.) | |

A 6 μm thick support layer was coated with a 15 μm layer of thermoplastic magnetic ink. A 2 μm thick layer of the overcoat composition was coated on the ink. The ink had the same composition as that shown in Example 35.

EXAMPLE 41

(for comparison)

An ink medium was prepared as follows:

| Thermoplastic Magnetic Ink Layer | |
|---|---|
| Magnetite fine grain (1000 Å) | 40 wt % |
| Purified paraffin wax (HNP-3) (produced by NIPPON SEIRO Co. Ltd.) | 30 wt % |
| Carnauba wax No. 1 (produced by NIKKO FINE PRODUCTS Co. Ltd.) | 19 wt % |
| Ethylene-vinyl acetate copolymer resin (EVA-410) (produced by DU PONT - MITSUI POLYCHEMICALS Co. Ltd.) | 7 wt % |
| Dyes | 3.9 wt % |
| Dispersing agent | 0.1 wt % |
| Composition of Overcoat Layer | |
| Microcrystalline wax (NHP-3) (produced by NIPPON SEIRO Co. Ltd.) | 70 wt % |
| Carnauba wax (produced by NIKKO FINE PRODUCTS Co. Ltd.) | 23 wt % |
| Ethylene-ethyl acrylate (MB-080) (produced by NIPPON UNICAR Co. Ltd.) | 7 wt % |
| Viscosity - 70 cp (100° C.) | |

A 6 μm thick support layer was coated with a 15 μm layer of the thermoplastic magnetic ink. An 8 μm thick layer of the overcoat composition was coated on the ink. Both the ink and the overcoat layer had the same compositions as those shown in Example 35. However, the thickness of the overcoat layer was increased.

Transfer printing was performed using the ink media prepared in Examples 35–41. A Sam magnet having a maximum energy product of 25 MGOe and a thermal head having a resolution of 180 DPI was used to apply thermal energy in an amount of 0.5 mJ/dot. Transfer paper having Beck's smoothness of 30 sec, 10 sec and 3 sec, respectively, was used.

Transfer rate and reproducibility of each print sample was estimated as shown in Table 5.

TABLE 5

| SUPPORT | Polyethylene terephthalate | | | | | | Polyimide | | | | | |
|---|---|---|---|---|---|---|---|---|---|---|---|---|
| ESTIMATION | Transfer efficiency | | | Dot reproducibility | | | Transfer efficiency | | | Dot reproducibility | | |
| TRANSFER PAPER | 30" | 10" | 3" | 30" | 10" | 3" | 30" | 10" | 3" | 30" | 10" | 3" |
| Example 35 | 100 | 100 | 94 | 100 | 100 | 96 | 100 | 100 | 95 | 100 | 100 | 95 |
| Example 36 | 100 | 100 | 93 | 100 | 100 | 92 | 100 | 100 | 92 | 100 | 100 | 91 |
| Example 37 | 100 | 100 | 95 | 100 | 100 | 98 | 100 | 100 | 95 | 100 | 100 | 97 |
| Example 38 | 100 | 100 | 93 | 100 | 100 | 94 | 100 | 100 | 91 | 100 | 100 | 95 |
| Example 39 | 100 | 65 | 40 | 100 | 70 | 55 | 100 | 60 | 40 | 100 | 75 | 50 |
| Example 40 | 55 | 35 | 25 | 50 | 40 | 30 | 60 | 40 | 25 | 55 | 40 | 25 |
| Example 41 | 50 | 60 | 75 | 55 | 60 | 80 | 50 | 65 | 78 | 50 | 52 | 75 |

$$\text{Transfer efficiency} = \frac{\text{Transfer area per dot of print sample}}{\text{Thermal area per dot of thermal head}}$$

$$\text{Dot reproducibility} = \frac{\text{Transfer dot quantity per one character}}{\text{Thermal dot quantity per one character}}$$

As shown in Table 5, thermoplastic magnetic ink media having overcoat layers in accordance with the invention realize excellent print quality, good transfer efficiency and good dot reproducibility for each type of transfer paper used, specifically, paper having Beck's smoothness of 30 sec, 10 sec and 3 sec, respectively. These results were obtained independent of the support layer used. It was determined that an overcoat layer having a thickness of less than about 5 μm was optimum. When the thickness of the overcoat layer was greater than about 5 μm, it was broken during transfer and transfer ceased due to the lowering of thermal efficiency and viscosity of the overcoat layer. This lowering of the "anchor effect" can be seen when the ink media of Example 41 was used.

It was also determined that a smooth wax overcoat layer has lower permeability and, accordingly, lower transfer efficiency than a rough layer. Furthermore, it is desirable for the ink layer and the support layer to be less than 40 μm and 30 μm thick, respectively. Additionally, overcoat layer viscosity at 100° C. of greater than about 100 cps causes the transfer efficiency to be lowered due to the "anchor effect".

Figure 25:
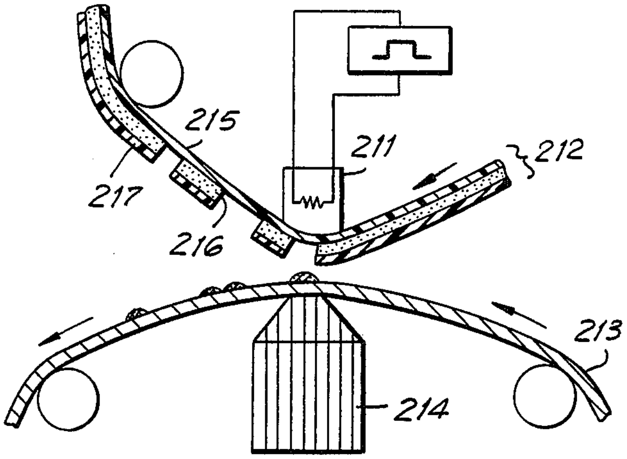
FIG. 25 is a schematic diagram of a non-contact type printing system for use with the ink media of the invention.

Although transfer of the ink media of this invention has been described in connection with contact type printing systems, the invention is also applicable to non-contact type printing systems of the type shown in FIG. 25. In the case of non-contact type printing systems, the thermoplastic magnetic ink media realize high quality printing with good transfer efficiency.

An electric head can be used in place of the thermal head for applying thermal energy. Furthermore, an electromagnet can be used as the means for generating magnetic attraction.

Figure 26:
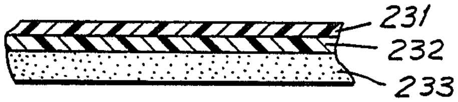
FIG. 26 is a side elevational view of an ink medium for use in the imprinting apparatus of the invention.

In a ninth preferred embodiment of the invention, a magnetic ink media having an undercoat layer is provided. This type of magnetic ink medium is shown in FIG. 26 which includes a support layer 231, an undercoat layer 212 and a thermoplastic magnetic ink layer 233.

It is desirable for the support layer to be heat-resistant, mechanically strong and smooth. The support layer can be formed of a resin film such as polyethylene, polypropylene, polyester, polyimide, polyethersulfone, polyethylene terephthalate and the like. The thickness of the support layer is preferably between about 1 and 30 μm and, more preferably, between about 1 and 15 μm.

The binder for the undercoat layer and for the thermoplastic magnetic ink layer can be formed of at least one thermoplastic organic material. Suitable thermoplastic organic materials include, but are not limited to, paraffin wax, microcrystalline wax, carnauba wax, oxidized wax, candelilla wax, montan wax, Fisher-Tropsh wax, α-olefin-maleic anhydride copolymer, fatty acid amide, fatty acid ester, distearylketone, ethylene-vinyl acetate copolymer, ethylene-ethyl acrylate copolymer, epoxy resin and the like.

The ferromagnetic material in the thermoplastic magnetic ink is magnetic fine grain of magnetite ($Fe_2O_3FeO$), manganese-zinc ferrite ($Mn—Zn—Fe_2O_3$), nickel-zinc ferrite ($Ni—Zn—Fe_2O_3$), garnet, a metal, an alloy or the like. The grain size of the magnetic fine grain is between about 10 and 10,000 Å and, more preferably, between about 500 and 5000 Å.

Printing systems using a thermoplastic magnetic ink medium can be either contact type as shown in FIG. 27 or non-contact type as shown in FIG. 28. In either of these types, tearing off of the ink from the ink medium arises between the support and the undercoat layer.

Thermoplastic magnetic ink media having undercoat layers were prepared and thermoprinting was performed.

A thermal head was used as the means for application of thermal energy, a permanent magnet was used as the means for production of magnetic attraction force and a contact type printing system of the type shown in FIG. 27 was used. Referring to FIG. 27, the contact type printing system used a thermal head 241, transfer paper 246 and a magnet 247. Thermoplastic magnetic ink 245 in ink medium 242 was brought into contact with transfer paper 246 just under the thermal head at the time of application of thermal energy to ink 245 through support 243 by means of the thermal head. The melted ink 248 adhered to transfer paper 246. The ink in the non-recording portion 249 was then lifted from transfer paper 246 in order to accomplish the ink transfer.

Polyethylene terephthalate film and polyimide film were used as supports. Thermoplastic magnetic media were prepared using the undercoat layer composition, ink layer composition, undercoat layer thickness, ink layer thickness and support layer thickness shown in the following examples. These examples are presented for purposes of illustration only and are not intended to be construed in a limiting sense.

EXAMPLE 42

An ink medium was prepared as follows:

| | |
|---|---|
| Thermoplastic Magnetic Ink Layer | |
| Magnetite fine grain (1000 Å) | 40 wt % |
| Microcrystalline wax (Hi-Mic-1045) (produced by NIPPON SEIRO Co. Ltd.) | 35 wt % |
| Carnauba wax (produced by NIKKO FINE PRODUCTS Co. Ltd.) | 16 wt % |
| Ethylene-vinyl acetate copolymer resin (EVA-577) (produced by DU PONT - MITSUI POLYCHEMICALS Co. Ltd.) | 5 wt % |
| Dyes | 3.9 wt % |
| Dispersing agent | 0.1 wt % |
| Composition of Undercoat Layer | |
| Paraffin wax (157° F.) (produced by NIPPON SEIRO Co. Ltd.) | 50 wt % |
| Microcrystalline wax (Hi-Mic-1045) (produced by NIPPON SEIRO Co. Ltd.) | 43 wt % |
| Ethylene-vinyl acetate copolymer resin (EVA-577) (produced by DU PONT - MITSUI POLYCHEMICALS Co. Ltd.) | 7 wt % |

A 6 μm thick support layer was coated with a 1 μm layer of the undercoat composition. A 15 μm thick layer of thermoplastic magnetic ink was coated on the undercoat layer.

EXAMPLE 43

An ink medium was prepared as follows:

| | |
|---|---|
| Thermoplastic Magnetic Ink Layer | |
| Magnetite fine grain (1000 Å) | 40 wt % |
| Microcrystalline wax (Hi-Mic-1045) (produced by NIPPON SEIRO Co. Ltd.) | 35 wt % |
| Carnauba wax (produced by NIKKO FINE PRODUCTS Co. Ltd.) | 16 wt % |
| Ethylene-vinyl acetate copolymer resin (EVA-577) (produced by DU PONT - MITSUI POLYCHEMICALS Co. Ltd.) | 5 wt % |
| Dyes | 3.9 wt % |
| Dispersing agent | 0.1 wt % |
| Composition of Undercoat Layer | |
| Paraffin wax (145° F.) (produced by NIPPON SEIRO Co. Ltd.) | 95 wt % |
| Ethylene-vinyl acetate copolymer resin (EVA-410) (produced by DU PONT - MITSUI POLYCHEMICALS Co. Ltd.) | 5 wt % |

A 6 μm thick support layer was coated with a 1 μm layer of the undercoat composition. A 15 μm thick layer of thermoplastic magnetic ink was coated on the undercoat layer. This is the same magnetic ink as that shown in Example 42.

EXAMPLE 44

An ink medium was prepared as follows:

| Composition of Ink Layer | |
|---|---|
| Magnetite fine grain (1000 Å) | 40 wt % |
| Paraffin wax (NHP-3) (produced by NIPPON SEIRO Co. Ltd.) | 36 wt % |
| Ethylene-ethyl acrylate (MB-080) (produced by NIPPON UNICAR Co. Ltd.) | 10 wt % |
| Carnauba wax (produced by NIKKO FINE PRODUCTS Co. Ltd.) | 10 wt % |
| Dyes | 3.9 wt % |
| Dispersing agent | 0.1 wt % |
| Composition of Undercoat Layer | |
| Paraffin wax (157° F.) (produced by NIPPON SEIRO Co. Ltd.) | 50 wt % |
| Microcrystalline wax (Hi-Mic-1045) (produced by NIPPON SEIRO Co. Ltd.) | 43 wt % |
| Ethylene-vinyl acetate copolymer resin (EVA-577) (produced by DU PONT - MITSUI POLYCHEMICALS Co. Ltd.) | 7 wt % |

A 12 μm thick support layer was coated with a 1 μm layer of the undercoat composition. This undercoat composition was the same as that shown in Example 42. A 30 μm thick layer of thermoplastic magnetic ink was coated on the undercoat layer.

EXAMPLE 45

An ink medium was prepared as follows:

| Thermoplastic Magnetic Ink Layer | |
|---|---|
| Magnetite fine grain (1000 Å) | 40 wt % |
| Microcrystalline wax (Hi-Mic-1045) (produced by NIPPON SEIRO Co. Ltd.) | 35 wt % |
| Carnauba wax (produced by NIKKO FINE PRODUCTS Co. Ltd.) | 16 wt % |
| Ethylene-vinyl acetate copolymer resin (EVA-577) (produced by DU PONT - MITSUI POLYCHEMICALS Co. Ltd.) | 5 wt % |
| Dyes | 3.9 wt % |
| Dispersing agent | 0.1 wt % |
| Composition of Uodercoat Layer | |
| Paraffin wax (157° F.) (produced by NIPPON SEIRO Co. Ltd.) | 50 wt % |
| Microcrystalline wax (Hi-Mic-1045) (produced by NIPPON SEIRO Co. Ltd.) | 43 wt % |
| Ethylene-vinyl acetate copolymer resin (EVA-577) (produced by DU PONT - MITSUI POLYCHEMICALS Co. Ltd.) | 7 wt % |

A 6 μm thick support layer was coated with a 5 μlayer of the undercoat composition. A 15 μm thick layer of thermoplastic magnetic ink was coated on the undercoat layer. Both the undercoat layer and the magnetic ink had the same compositions as those shown in Example 42. However, the undercoat layer thickness was increased.

Example 43 differs from Example 42 in the undercoat composition, Example 44 differs in ink layer composition and Example 45 differs in undercoat layer thickness.

EXAMPLE 46

(for comparison)

A prior art type thermoplastic magnetic ink medium of the type shown in FIG. 29 having a support layer 261 and a thermoplastic magnetic ink layer 263 was prepared as follows:

| Thermoplastic Magnetic Ink Layer | |
|---|---|
| Magnetite fine grain (1000 Å) | 40 wt % |
| Microcrystalline wax (Hi-Mic-1045) (produced by NIPPON SEIRO Co. Ltd.) | 35 wt % |
| Carnauba wax (produced by NIKKO FINE PRODUCTS Co. Ltd.) | 16 wt % |
| Ethylene-vinyl acetate copolymer resin (EVA-577) (produced by DU PONT - MITSUI POLYCHEMICALS Co. Ltd.) | 5 wt % |
| Dyes | 3.9 wt % |
| Dispersing agent | 0.1 wt % |

A 6 μm thick support layer was coated with a 15 μm thick ink layer.

EXAMPLE 47

(for comparison)

An ink medium was prepared as follows:

| Thermoplastic Magnetic Ink Layer | |
|---|---|
| Magnetite fine grain (1000 Å) | 40 wt % |
| Microcrystalline wax (Hi-Mic-1045) (produced by NIPPON SEIRO Co. Ltd.) | 35 wt % |
| Carnauba wax (produced by NIKKO FINE PRODUCTS Co. Ltd.) | 16 wt % |
| Ethylene-vinyl acetate copolymer resin (EVA-577) (produced by DU PONT - MITSUI POLYCHEMICALS Co. Ltd.) | 5 wt % |
| Dyes | 3.9 wt % |
| Dispersing agent | 0.1 wt % |
| Composition of Undercoat Layer | |
| Paraffin wax (157° F.) (produced by NIPPON SEIRO Co. Ltd.) | 50 wt % |
| Microcrystalline wax (Hi-Mic-1045) (produced by NIPPON SEIRO Co. Ltd.) | 43 wt % |
| Ethylene-vinyl acetate copolymer resin (EVA-577) (produced by DU PONT - MITSUI POLYCHEMICALS Co. Ltd.) | 7 wt % |

A 6 μm thick support layer was coated with an 8 μm layer of the undercoat composition. A 15 μm thick layer of thermoplastic magnetic ink was coated on the undercoat layer. The undercoat layer and the ink had the same compositions as those shown in Example 42. However, the thickness of the undercoat layer was increased.

Transfer printing was performed using the ink media of Examples 42–47. A Sam magnet having a maximum energy product of 25 MGOe was used and a thermal head having a resolution of 180 DPI was used to apply thermal energy of 0.5 mJ/dot. Transfer paper material having Beck's smoothness of 30 sec, 10 sec and 3 sec, respectively, was used.

Each print sample was estimated by transfer rate and reproducibility and the results are shown in Table 6.

TABLE 6

| SUPPORT | Polyethylene terephthalate | | | | | | Polyimide | | | | | |
|---|---|---|---|---|---|---|---|---|---|---|---|---|
| ESTIMATION | Transfer efficiency | | | Dot reproducibility | | | Transfer efficiency | | | Dot reproducibility | | |
| TRANSFER PAPER | 30" | 10" | 3" | 30" | 10" | 3" | 30" | 10" | 3" | 30" | 10" | 3" |
| Example 42 | 100 | 100 | 95 | 100 | 100 | 98 | 100 | 100 | 96 | 100 | 100 | 98 |
| Example 43 | 100 | 100 | 93 | 100 | 100 | 95 | 100 | 100 | 95 | 100 | 100 | 95 |

TABLE 6-continued

| SUPPORT | Polyethylene terephthalate | | | | | | Polyimide | | | | | |
|---|---|---|---|---|---|---|---|---|---|---|---|---|
| ESTIMATION | Transfer efficiency | | | Dot reproducibility | | | Transfer efficiency | | | Dot reproducibility | | |
| TRANSFER PAPER | 30" | 10" | 3" | 30" | 10" | 3" | 30" | 10" | 3" | 30" | 10" | 3" |
| Example 44 | 100 | 100 | 95 | 100 | 100 | 99 | 100 | 100 | 95 | 100 | 100 | 98 |
| Example 45 | 100 | 100 | 93 | 100 | 100 | 96 | 100 | 100 | 95 | 100 | 100 | 97 |
| Example 46 | 100 | 65 | 40 | 100 | 70 | 60 | 100 | 67 | 45 | 100 | 70 | 67 |
| Example 47 | 100 | 100 | 90 | 100 | 100 | 95 | 100 | 100 | 90 | 100 | 100 | 93 |

Note:
In the case of Example 47, the undercoat and ink layers were separated from each other owing to the tension during transferring or by means of the edge of the head. Therefore, Example 47 is unsuitable for dynamic printing.

$$\text{Transfer efficiency} = \frac{\text{Transfer area per dot of print sample}}{\text{Thermal area per dot of thermal head}}$$

$$\text{Dot reproducibility} = \frac{\text{Transfer dot quantity per one letter}}{\text{Thermal dot quantity per one letter}}$$

In addition, each sample was solid printed and immediately after printing the sample was examined for peeling from the edge of thermal head. The results are shown in Table 7.

TABLE 7

| | Peeling force |
|---|---|
| Example 42 | 5.0 g/cm |
| Example 43 | 5.5 g/cm |
| Example 44 | 5.0 g/cm |
| Example 45 | 4.3 g/cm |
| Example 46 | 15.0 g/cm |
| Example 47 | 3.0 g/cm |

As can be seen in Table 6, thermoplastic magnetic ink media having an undercoat layer in accordance with the invention exhibited excellent print quality and good transfer efficiency. Furthermore, dot reproducibility is good irrespective of the Beck smoothness of the transfer paper. Additionally, these results were obtained independent of the support used.

Transfer was optimum when the undercoat layer thickness was less than about 5 μm. When the undercoat layer thickness was over 5 μm, the undercoat layer was peeled off during the transfer due to lower adhesion to the support, increased mechanical fragility and the like. Print stain also resulted and dynamic printing was not possible. In order to overcome problems such as peeling, breaking and the like, the ink layer should have a thickness of less than about 40 μm.

The use of conventional ink media as shown in Examples 46 and 47 did not provide transfer printing with good reproducibility on rough paper having Beck's smoothness of 10 sec and 3 sec. The conventional ink media was inferior because ink remained on the support, the dot size was small and the like.

As shown in Table 7, peel-off force for the thermoplastic magnetic ink media of the invention was reduced to about one-third of the amount of force necessary for "peeling-off" conventional ink media.

Although contact type printing systems have been described, this invention is also applicable to non-contact type printing systems. Furthermore, in the case of non-contact type printing systems, the thermoplastic magnetic ink media exhibited high quality printing with good transfer efficiency.

An electric head can be used as the means for applying thermal energy instead of the thermal head. No difference in the effects is observed when the substitution is made.

The above described embodiments of the invention can be employed independently of each other or in conjunction with each other. The means for applying thermal energy is not limited to a thermal head. Any type of heat transfer system including electric current conduction type transfer systems, can be used.

Two or more embodiments of the invention can be used in combination and, in such a case, all the effects, such as transfer efficiency, are improved. The most useful combination i.e. the combination having the highest transfer efficiency, the highest print quality and the lowest print energy was combination of the second, third, fifth, sixth, seventh, eighth and ninth embodiments.

Figure 30:
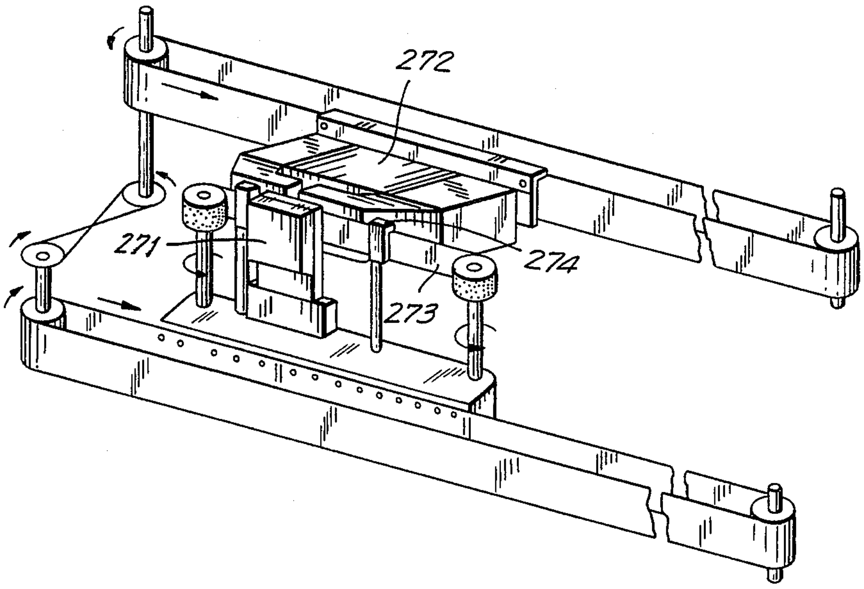
FIG. 30 is a perspective view of an imprinting apparatus of the invention.

FIG. 30 shows an imprinting apparatus of the invention which is arranged so that the second, third, fifth, sixth, seventh, eighth and ninth embodiments are used in combination. A serial type thermal head having 180 DPI and 24 pins was used. Thermal head 271 and magnetic head 272 were disposed in opposition to each other and driven by belts in order to move together so that the distance between thermal head 271 and magnetic head 272 was constant.

Magnetic ink film 273 was wound onto a take-up roller 275 in synchronism with the movement of the heads. Halogen lamps 274 were provided on the opposite sides of the thermal head 271 in order to apply thermal bias to the magnetic ink film 273 before and after transfer.

Magnetic ink film 273 had an uneven structure and an overcoat layer and an undercoat layer.

Thermal energy was applied in time division. Both before and after the application of thermal energy, pulse biasing energy was applied as an auxiliary thermal application.

Figure 31:
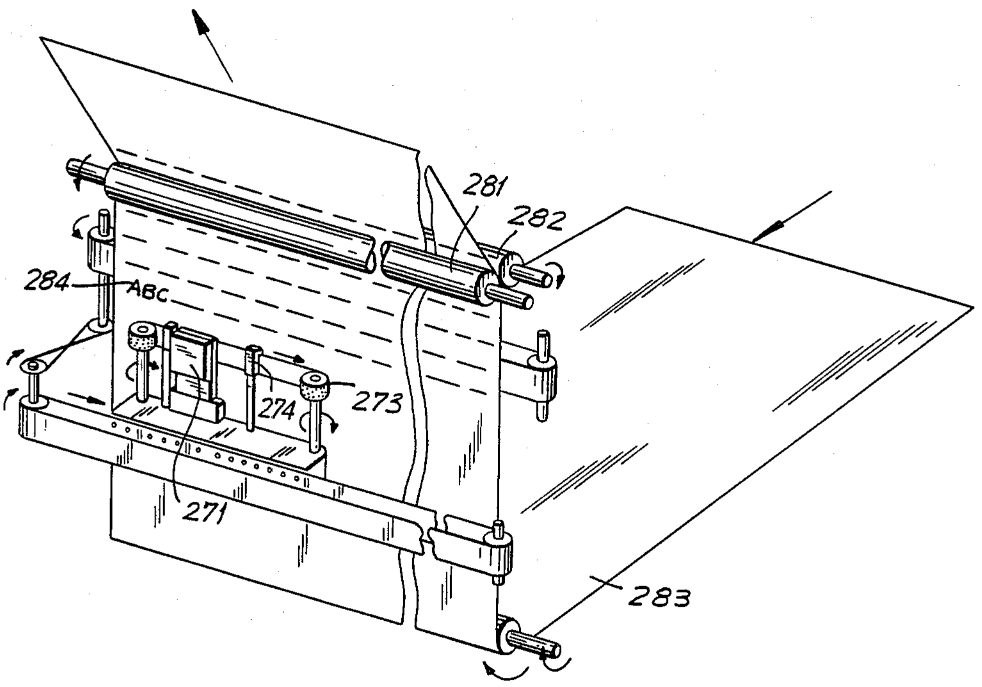
FIG. 31 is a perspective view of an imprinting apparatus of the invention.

Upon insertion of transfer paper, the arrangement of the apparatus is shown in FIG. 31. Transfer paper 283 and magnetic ink film 273 are not in contact with each other during printing. Specifically, transfer paper 283 and magnetic ink film 273 are separated by a distance of 120 μm. The printed recording dots are hot rolled by heat roller 281 and backup roller 282. In this case there was a 100% transfer efficiency of recording dots. Furthermore, high speed printing was realized without any print stain.

Figure 32:
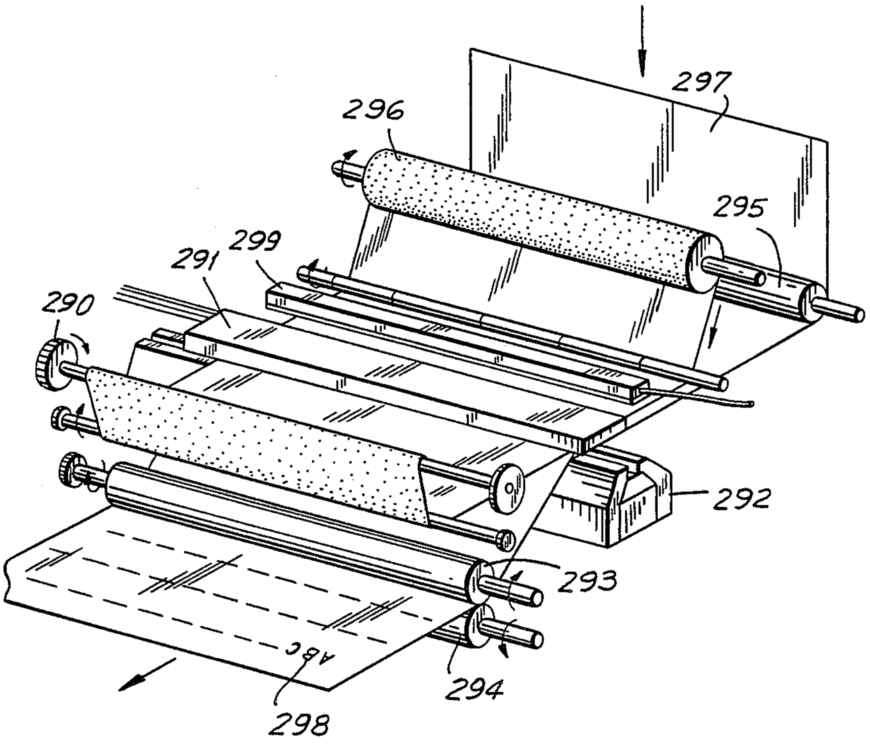
FIG. 32 is a perspective view of an alternate embodiment of the imprinting apparatus of the invention.

FIG. 32 shows another embodiment of the imprinting apparatus of the invention in which a line head is used as a thermal head. The arrangement of the apparatus of this embodiment is substantially the same as the arrangement of the apparatus of the previous embodiment wherein a serial head was used.

In the embodiment shown in FIG. 32, thermal head 291 and magnetic head 292 are disposed in opposition to each other and set so that the vertical facing distance between thermal head 291 and magnetic head 292 was constant in any portion of thermal head 291.

Transfer paper 297 and magnetic ink film 296 were not in contact with each other during printing. The distance between transfer paper 297 and magnetic ink film 296 was 120 μm. The printed dots were hot rolled by heat roller 281 and backup roller 282 in order to obtain recording dots 298. Halogen lamps 299 were provided on opposite sides of thermal head 291 in order to apply thermal bias to magnetic ink film 296 before and after transfer.

Magnetic ink film 296 had an uneven structure and an overcoat layer and an undercoat layer.

Thermal energy was applied in time division and, both before and after the application, pulse bias energy was applied as an auxiliary thermal application.

The recording dots exhibited 100% transfer efficiency. Furthermore, high speed printing was realized without any print stain.

It is to be understood that the specific embodiments described are shown merely by way of example and the present invention is not limited to these specific embodiments. For example, the invention is applicable to all imprinting apparatus in which the recording portion of the thermoplastic magnetic ink is transferred to the transfer paper by controlled thermal energy and application of magnetic attraction force.

The embodiment wherein energy application for every recording dot transferred is applied to the ink a plurality of times, i.e. two or more times in time division per recording dot transferred, is applicable not only to non-contact type imprinting apparatus in which the ink and transfer medium are not in contact with each at a non-recording portion, but also to a contact type imprinting apparatus in which the ink and the transfer medium are in contact with each other both at the recording portions and the non-recording portions.

The system for the application of bias energy as auxiliary energy is applicable to the contact type imprinting apparatus described so long as the auxiliary energy is applied after application of the main transfer energy. As described, at least the surface portion of the ink is melted by the auxiliary energy.

Similarly, thermal biasing is applicable to a non-contact type imprinting apparatus as described so long as the thermal biasing is applied after imprinting.

With respect to the ink medium, techniques such as provision of an uneven portion on the surface of the magnetic ink layer, provision of an overcoat layer on the surface of the ink layer, provision of an undercoat layer between the ink and the support layers, or the like are applicable not only to a non-contact type imprinting apparatus, but also to ink media for use in a contact type imprinting apparatus.

In an imprinting apparatus having means for applying thermal energy to a recording portion of thermoplastic magnetic ink and means for generating magnetic attraction force in the ink whereby the recording portion of the ink is transferred to transfer paper, the ink and transfer paper are not in contact with each other at a non-recording portion of the ink so that it is possible to omit the conventional process of tearing off the ink medium and thereby improve the transfer efficiency of the ink. Being of the non-contact type, the ink is transferred regardless of the surface form of the transfer paper. Accordingly, it is possible to obtain normally shaped recording dots, that is, recording dots having high transfer efficiency. Therefore, quality characteristics and graphic images can be reproduced even on paper having inferior surface smoothness, film having low affinity for ink and the like.

Furthermore, since the non-recording portion of the ink medium is not in contact with the transfer paper, no print stain occurs.

Because there is little heat loss, thermal energy can be reduced and the time of applications of thermal energy can be shortened so that it is possible to increase the print speed. Additionally, the use of an electromagnet as the means for magnetic attraction force makes it possible to control the attractive force and, in the period when transfer is not occurring, it is possible to prevent magnetic particles like dust, ink and the like from adhering to the electromagnetic head by cutting off power.

When a permanent magnetic head is used, it is possible to form an energy saving apparatus.

When thermal energy is applied from the thermal head to the ink in time division, the ink is not overheated. Accordingly, the ink itself is free from heat destruction and excellent transfer efficiency using a minimum of thermal energy can be achieved. This is another means for providing an energy saving imprinting apparatus.

When auxilialry energy is applied before and/or after the application of thermal energy, the ink is preheated to a temperature near the melting point of the ink and/or the ink is heated by the thermal transfer energy so as to maintain a constant temperature. In this manner, it is possible to achieve ink transfer having excellent transfer efficiency with minimal thermal energy. Furthermore, high speed printing is possible.

When thermal bias is applied to the ink before and/or after imprinting, the ink can be activated and the activated ink is maintained at a constant condition after imprinting in order to make it possible to perform transferring with lower imprinting energy than transfer can be performed according to prior art methods. Furthermore, transfer efficiency can be improved excessively and thermal imprinting energy can be reduced so that it is possible to perform high speed and high resolution printing.

When a heat roller is provided, recording dots transferred to the transfer paper can be hot rolled by the heat roller in order to enlarge the recording dot area and to improve the fixing force between the transfer paper and the recording dots. Due to the enlargement of the recording dots, the required thermal energy is less than the energy needed for the prior art transfer processes. Accordingly, high speed and high resolution printing is possible.

When the ink layer has an uneven structure on its surface, the work load required for the transformation or "flying" of the ink is relatively little for a given magnetic attraction force. Accordingly, transfer efficiency is improved over transfer efficiency of conventional ink media having a smooth surface. Thermal energy can be reduced so that it is possible to perform high speed and high resolution printing.

Additionally, by providing an overcoat layer on the front surface of the ink layer, the adhesive force between the ink and the transfer paper is increased. Specifically, the inequality $$F_b, F_A >> F_C, F_d$$

is satisfied for the forces shown in FIG. 2 and transfer efficiency is greatly improved.

In addition, by providing an undercoat layer on the rear surface of the ink layer, that is, between the support layer and the ink layer, the peeling property of the support layer can be improved. Accordingly, transfer efficiency is improved.

Since the ink is accordance with the invention or the thermoplastic magnetic ink medium has excellent peeling properties, it is possible to lower the peeling power and perform high speed printing.

The effects mentioned above are increased when the features of the invention are combined.

In summary, the present invention has at least one of the following features:

1. Recording dots can be printed with high transfer efficiency, even onto transfer paper having inferior surface smoothness or onto film having low affinity for ink;
2. Print stain can be prevented;
3. Heat loss in print energy can be reduced; and
4. High resolution recording dots can be printed.

The present invention is not limited to the specific embodiments described, but is applicable to all the imprinting methods and apparatuses of the type in which a recording portion of thermoplastic magnetic ink is transferred to transfer paper by magnetic attraction force under the control of thermal energy.

It will thus be seen that the objects set forth above, among those made apparent from the preceding description, are efficiently attained and, since certain changes may be made in carrying out the above process, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An imprinting apparatus for printing on a transfer medium by transferring thermoplastic magnetic ink having a recording portion and a non-recording portion to said transfer medium, comprising application means for controlling application of thermal energy to said recording portion of said thermoplastic magnetic ink and generating means for generating magnetic attraction force in said ink, said recorded portion of said ink being transferred to said transfer medium by said magnetic attraction force while said application means controls application of said thermal energy, said ink not contacting said transfer medium in said non-recording portion of said ink.

2. The imprinting apparatus of claim 1, wherein the application means comprises a thermal head.

3. The imprinting apparatus of claim 2, wherein the thermal head has a resolution of between about 180 and 2000 DPI.

4. The imprinting apparatus of claim 1, wherein the thermoplastic magnetic ink is provided as part of an ink medium having a base film coated with thermoplastic magnetic ink.

5. The imprinting apparatus of claim 4, wherein the base film is a heat resistant resin.

6. The imprinting apparatus of claim 5, wherein the heat resistant resin is a uniform resin.

7. The imprinting apparatus of claim 5, wherein the heat resistant resin is selected from the group consisting of polyethylene terephthalate, polyimide, polyamidoimide, polyetheretherketone, polysulfone, polyethersulfone, polyethylene, polypropylene and polystyrene.

8. The imprinting apparatus of claim 7, wherein the heat resistant resin is polyethylene terephthalate.

9. The imprinting apparatus of claim 7, wherein the heat resistant resin is polyimide.

10. The imprinting apparatus of claim 5, wherein the base film has a thickness of between about 1 and 10 μm.

11. The imprinting apparatus of claim 5, wherein the thermoplastic magnetic ink comprises a binder and a ferromagnetic material disposed in the binder.

12. The imprinting apparatus of claim 11, wherein the binder comprises at least one component selected from the group consisting of paraffin wax, microcrystalline wax, carnauba wax, α-olefin maleic anhydride copolymer, oxidized wax, polyethylene wax, fatty acid amide, fatty acid ester, ethylene vinyl acetate copolymer, ethylene ethyl acrylate and distearylketone.

13. The imprinting apparatus of claim 12, wherein the ferromagnetic material is selected from the group consisting of fine grain magnetite, manganese-zinc ferrite, nickel-zinc ferrite, garnet, metal, and metal alloys of iron, cobalt or nickel.

14. The imprinting apparatus of claim 13, wherein the grain size of the ferromagnetic material is between about 10 and 10,000 Å.

15. The imprinting apparatus of claim 14, wherein the grain size of the ferromagnetic material is between about 500 and 5000 Å.

16. The imprinting apparatus of claim 1, wherein the generating means comprises an electromagnet.

17. The imprinting apparatus of claim 1, wherein the electromagnet comprises a core having two top end portions said top end portions having a gap therebetween.

18. The imprinting apparatus of claim 17, wherein the core is a high permeability material.

19. The imprinting apparatus of claim 18, wherein the high permeability material is selected from the group consisting of iron, iron-silicon, iron-nickel, manganese-zinc ferrite and nickel-zinc ferrite.

20. The imprinting apparatus of claim 17, wherein the top end portions are a high saturation flux density material.

21. The imprinting apparatus of claim 20, wherein the high saturation flux density material is iron-cobalt.

22. The imprinting apparatus of claim 17, wherein the gap between the top end portions is less than about 1000 μm.

23. The imprinting apparatus of claim 17, wherein the electromagnet has a magnetomotive force of greater than about 500.

24. The imprinting apparatus of claim 18, wherein the core is permendur.

25. The imprinting apparatus of claim 1, wherein the generating means comprises a permanent magnet.

26. The imprinting apparatus of claim 25, wherein the permanent magnet has a large maximum energy product.

27. The imprinting apparatus of claim 26, wherein the maximum energy product is greater than about 10 MGOe.

28. The imprinting apparatus of claim 25, wherein the permanent magnet is an alnico magnet.

29. The imprinting apparatus of claim 25, wherein the permanent magnet is a barium-ferrite magnet.

30. The imprinting apparatus of claim 25, wherein the permanent magnet is a rare earth magnet.

31. The imprinting apparatus of claim 25, wherein the permanent comprises a yoke having two top end portions and a gap between said top end portions.

32. The imprinting apparatus of claim 31, wherein the yoke is formed of a high permeability material.

33. The imprinting apparatus of claim 32, wherein the high permeability material is selected from the group consisting of iron, iron-silicon, iron-nickel, manganese-zinc ferrite and nickel-zinc ferrite.

34. The imprinting apparatus of claim 31, wherein the top end portions are a high saturation flux density material.

35. The imprinting apparatus of claim 34, wherein the high saturation flux density material is iron-cobalt.

36. The imprinting apparatus of claim 31, wherein the gap is between about 100 and 1000 μm.

37. The imprinting apparatus of claim 31, wherein the yoke is permendur.

38. The imprinting apparatus of claim 25, wherein the permanent magnet is a Sam magnet.

39. The imprinting apparatus of claim 1, wherein pulse sharing is used to prolong the period of time during which the ink temperature is maintained at a temperature above the melting point of the ink.

40. The imprinting apparatus of claim 1, wherein bias energy is applied to the ink prior to application of thermal energy.

41. The imprinting apparatus of claim 1, wherein bias energy is applied to the ink after the application of thermal energy.

42. The imprinting apparatus of claim 1, wherein bias energy is applied to the ink both before and after application of thermal energy.

43. The imprinting apparatus of claim 1 wherein thermal bias is applied to the transfer medium prior to transferring the ink to the transfer medium.

44. The imprinting apparatus of claim 1, wherein thermal bias is applied to the transfer medium after transfer of the ink to the transfer medium.

45. The imprinting apparatus of claim 1, wherein thermal bias is applied to the transfer medium both prior to and after transfer of the ink to the transfer medium.

46. The imprinting apparatus of claim 1, further comprising rolling means for thermally rolling recording portion ink after transfer of the ink to the transfer medium.

47. The imprinting apparatus of claim 46, wherein the rolling means is a heat roller.

48. The imprinting apparatus of claim 1, wherein the generating means comprises a closed magnetic circuit having a magnetic material therein and wherein said magnetic material has a discontinuous portion so as to utilize leakage flux from the discontinuous portion to generate magnetic attraction force.

49. The imprinting apparatus of claim 48, wherein the magnetic attraction force is generated primarily by leakage flux at an edge portion of the discontinuous portion.

50. The imprinting apparatus of claim 1, wherein thermal bias is applied to the transfer medium using a halogen lamp.

51. The imprinting apparatus of claim 1, wherein thermal bias is applied to the transfer medium using a dryer-heater.

52. A thermoplastic magnetic ink medium comprising:

a support layer;

a thermoplastic magnetic ink layer composed of thermoplastic material containing thermomagnetic particles disposed on the support layer; and an overcoat layer disposed on the ink layer.

53. The thermoplastic magnetic ink medium of claim 52, wherein the overcoat layer is a thermoplastic layer having a thermal melting viscosity at 100° C. of less than about 100 cps.

54. A method of imprinting by transferred ink onto a transfer paper from an ink medium having a recording portion and a non-recording portion comprising applying a controlled amount of thermal energy to said recording portion of said thermoplastic magnetic ink and generating magnetic attraction force in said ink, transferring said recording portion ink to said transfer medium by said magnetic attraction force when said thermal energy is applied, said transfer medium avoiding contact with non-recording portion ink.

55. The method of claim 54, wherein thermal energy is applied using a thermal head.

56. The method of claim 54, wherein the magnetic attraction force is generated using an electromagnet.

57. The method of claim 54, wherein magnetic attraction force is generated using a permanent magnet.

58. The method of claim 54, wherein thermal energy is applied by means of pulse sharing.

59. The method of claim 54, further comprising applying bias energy to the ink prior to application of thermal energy.

60. The method of claim 54, further comprising applying bias energy to the ink after application of thermal energy.

61. The method of claim 54, further comprising applying bias energy to the ink both before and after application of thermal energy.

62. The method of claim 54, further comprising applying thermal bias to the tranfer medium prior to transfer of the ink.

63. The method of claim 54, further comprising the step of applying thermal bias to the transfer medium after transfer of the ink.

64. The method of claim 54, further comprising applying thermal bias to the transfer medium both prior to and after transfer of the ink to the transfer medium.

65. The method of claim 54, further comprising rolling recording portion ink after transfer of the ink to the transfer medium.

* * * * *